United States Patent
Soriaga et al.

(10) Patent No.: US 12,445,830 B2
(45) Date of Patent: *Oct. 14, 2025

(54) CONFIGURING A MAXIMUM NUMBER OF LAYERS

(71) Applicant: QUALCOMM Incorporated, San Diego, CA (US)

(72) Inventors: Joseph Binamira Soriaga, San Diego, CA (US); Peter Gaal, San Diego, CA (US); Alexandros Manolakos, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/914,014

(22) Filed: Jun. 26, 2020

(65) Prior Publication Data

US 2020/0336893 A1  Oct. 22, 2020

Related U.S. Application Data

(63) Continuation of application No. 16/679,074, filed on Nov. 8, 2019.

(Continued)

(51) Int. Cl.
*H04W 8/24* (2009.01)
*H04B 7/06* (2006.01)
(Continued)

(52) U.S. Cl.
CPC ............ *H04W 8/24* (2013.01); *H04B 7/0626* (2013.01); *H04L 1/0026* (2013.01);
(Continued)

(58) Field of Classification Search
CPC .. H04W 8/24; H04W 72/042; H04L 25/0226; H04L 5/0092; H04L 5/0051; H04B 7/0626
See application file for complete search history.

(56) References Cited

U.S. PATENT DOCUMENTS 9,226,136 B2   12/2015  Kim et al.
10,341,996 B2   7/2019  Takahashi et al.
(Continued)

FOREIGN PATENT DOCUMENTS

CN   107615795 A   1/2018
CN   108141789 A   6/2018
(Continued)

OTHER PUBLICATIONS

InterDigital, "On TRI and TPMI indication for CB-based UL transmission"; 3GPP TSG RAN, Jan. 22-26, 2018, Chapters 1-3 (Year: 2018).*

(Continued)

*Primary Examiner* — Chuong M Nguyen
(74) *Attorney, Agent, or Firm* — Holland & Hart LLP

(57) ABSTRACT

Methods, systems, and devices for wireless communications are described. Generally, a user equipment (UE) may send a capabilities report to a base station. The capabilities report may include an explicit indication that the UE is capable of receiving a maximum layer radio resource control (RRC) parameter, or may include ambiguous (e.g., multiple) capabilities. The base station may receive the capabilities report, and may determine whether to transmit a maximum layer RRC parameter based on the explicit indication, or the ambiguous capabilities, which indicates a maximum number of layers to be used for subsequent communications. If the UE is capable of receiving the maximum layer RRC parameter, the base station may send the maximum layer RRC parameter to the UE, and may perform wireless communi- (Continued)

cations according to the indicated maximum number of layers.

16 Claims, 16 Drawing Sheets

Related U.S. Application Data

(60) Provisional application No. 62/759,952, filed on Nov. 12, 2018.

(51) Int. Cl.
| | |
|---|---|
| *H04L 1/00* | (2006.01) |
| *H04L 5/00* | (2006.01) |
| *H04L 25/02* | (2006.01) |
| *H04W 24/10* | (2009.01) |
| *H04W 72/23* | (2023.01) |

(52) U.S. Cl.
CPC .......... *H04L 5/0051* (2013.01); *H04L 5/0092* (2013.01); *H04L 25/0226* (2013.01); *H04W 24/10* (2013.01); *H04W 72/23* (2023.01)

(56) References Cited

U.S. PATENT DOCUMENTS

| | | | | |
|---|---|---|---|---|
| 10,411,774 | B2 | 9/2019 | Suzuki | |
| 10,716,116 | B2* | 7/2020 | Gerstenberger | .... H04W 72/042 |
| 10,880,060 | B2 | 12/2020 | Suzuki et al. | |
| 12,058,664 | B2 | 8/2024 | Kakishima et al. | |
| 2010/0050034 | A1* | 2/2010 | Che | ........................ H04L 1/1845 714/748 |
| 2014/0112247 | A1 | 4/2014 | Chen et al. | |
| 2014/0187283 | A1* | 7/2014 | Nimbalker | ............ H04W 72/51 455/550.1 |
| 2014/0321369 | A1* | 10/2014 | Davydov | ............ H04L 65/1016 370/329 |
| 2016/0081076 | A1* | 3/2016 | Zhang | ............... H04W 72/0446 370/336 |
| 2016/0173262 | A1* | 6/2016 | Davydov | .............. H04W 48/16 370/329 |
| 2017/0078065 | A1 | 3/2017 | Nam et al. | |
| 2017/0238300 | A1* | 8/2017 | Gerstenberger | ...... H04W 72/20 370/329 |
| 2017/0245142 | A1* | 8/2017 | Takahashi | ............ H04B 7/0628 |
| 2018/0041981 | A1 | 2/2018 | Wu | |
| 2018/0191414 | A1* | 7/2018 | Suzuki | .................. H04W 16/28 |
| 2018/0198497 | A1 | 7/2018 | Wei et al. | |
| 2018/0198502 | A1 | 7/2018 | Kim et al. | |
| 2018/0323934 | A1 | 11/2018 | Suzuki et al. | |
| 2019/0058509 | A1* | 2/2019 | Tomala | .................. H04W 76/19 |
| 2019/0379501 | A1* | 12/2019 | Park | ...................... H04W 16/28 |
| 2020/0100178 | A1 | 3/2020 | Kim et al. | |
| 2020/0128479 | A1 | 4/2020 | Xu et al. | |
| 2020/0154267 | A1* | 5/2020 | Soriaga | ................. H04L 5/0057 |
| 2020/0396684 | A1 | 12/2020 | Lin et al. | |
| 2021/0175935 | A1 | 6/2021 | Kwon et al. | |
| 2021/0352580 | A1 | 11/2021 | Zhou et al. | |

FOREIGN PATENT DOCUMENTS

| | | | |
|---|---|---|---|
| CN | 107911868 B | 7/2021 | |
| EP | 3386113 A1 | 10/2018 | |
| KR | 101909038 B1 | 10/2018 | |
| WO | WO-2016164074 A1 * | 10/2016 | ........... H04B 7/0626 |
| WO | WO-2018084971 A1 | 5/2018 | |
| WO | WO-2018130115 A1 | 7/2018 | |

OTHER PUBLICATIONS

InterDigital NPL "On TRI and TPMI indication for CB-based UL transmission", 3GPP R1-1800626, Jan. 22-26, 2018 (Year: 2018).*
CATT NPL "Further discussion on codebook based transmission for UL", 3GPP R1-1717807, Oct. 9-13, 2017 (Year: 2017).*
CATT "Further discussion on codebook based transmission for UL", 3GPP R1-1717807, Oct. 9-13, 2017 (Year: 2017).*
MediaTek "Discussion on MIMO layer configuration", 3GPP R1-1813338, Nov. 12-16, 2018 (Year: 2018).*
CATT:"Further Discussion on Codebook Based Transmission for UL", 3GPPDraft, 3GPP TSG RAN WG1 Meeting 90bis, R1-1717807, 3rd Generation PartnershipProject (3GPP), Mobile Competence Centre, 650, Route Des Lucioles, F-06921Sophia-Antipolis Cedex ; France, vol. RAN WG1, No. Prague, CZ, Oct. 9, 2017-Oct. 13, 2017, Oct. 8, 2017 (Oct. 8, 2017), XP051340992, 5 Pages, Retrieved fromthe Internet: URL: http://www.3gpp.org/ftp/Meetings_3GPP_SYNC/RAN1/Docs/[retrieved on Oct. 8, 2017] chapter 2.1.
Huawei, et al., "Soft Buffer Dimensioning", 3GPP Draft, 3GPP TSG-RAN WG4Meeting #86, R4-1802860, 3rd Generation Partnership Project (3GPP), MobileCompetence Centre, 650, Route Des Lucioles, F-06921 Sophia-Antipolis Cedex, France, vol. RAN WG4, No. Athens, Greece, Feb. 26, 2018-Mar. 2, 2018, Feb. 19, 2018 (Feb. 19, 2018), XP051402948, 5 Pages, Retrieved from the Internet: URL: http://www.3gpp.org/ftp/tsg%5Fran/WG4%5FRadio/TSGR4%5F86/Docs/ [retrieved onFeb. 19, 2018], chapter 1.
Interdigital Inc: "On TRI and TPMI Indication for CB-based UL Transmission", 3GPP Draft, 3GPP TSG RAN WG1 Meeting AH 1801, R1-1800626_On TRI And TPMI Indication ForCB-Based UL Transmission, 3rd Generation Partnership Project (3GPP), MobileCompetence Centre, 650, Route Des Lucioles, F-06921 Sophia-Antipolis, vol. RAN WG1, No. Vancouver, Canada, Jan. 22, 2018-Jan. 26, 2018, Jan. 13, 2018(Jan. 13, 2018), XP051384956, 4 Pages, Retrieved from the Internet: URL: http://www.3gpp.org/ftp/tsg%5Fran/WG1%5FRL1/TSGR1%5FAH/NR%5FAH%5F1801/Docs/[retrieved on Jan. 13, 2018], chapter 1, chapter 2, chapter 3.
Internationalsearch Report and Written Opinion—PCT/US2019/060794—ISA/EPO—dated Feb. 3, 2020.
Qualcomm [Rani]: "[Draft] Response LS on MIMO Layer Configuration", 3GPPDraft, 3GPP TSG-RAN WG1 Meeting #95, R1-1813390 Draft Response LS on Mimolayer Configuration, 3rd Generation Partnership Project (3GPP), Mobilecompetence Centre, 650, Route Des Lucioles, F-06921 Sophia-Antipolis Cedex,F, vol. RAN WG1, No. Spokane, Wa, U.S.A., Nov. 12, 2018-Nov. 16, 2018, Nov. 11, 2018 (Nov. 11, 2018), XP051555421, 2 Pages, Retrieved from the Internet: URL: http://www.3gpp.org/ftp/Meetings%5F3GPP%5FSYNC/RAN1/Docs/R1%2D1813390%2Ezip[retrieved on Nov. 11, 2018] chapter 1, Q1-Q5.
U.S. Appl. No. 62/759,952, filed Nov. 12, 2018, 116 pages.
RAN2: "LS on MIMO Layer Configuration", 3GPP TSG RAN WG2 #103bis, R2-1816065, Chengdu, China, Oct. 8-12, 2018, 2 Pages, Oct. 12, 2018.
Mediatek Inc: "Discussion on MIMO Layer Configuration", R1-1813338 Disc Mimo Layer Configuration, 3rd Generation Partnership Project, Mobile Competence Centre, 650, Route Des Lucioles, F-06921 Sophia-Antipolis Cedex, France, vol. RAN WG1, No. Spokane, USA, Nov. 12, 2018-Nov. 16, 2018 Nov. 11, 2018, XP051555365, 5 Pages.
ETSI: "LTE, Evolved Universal Terrestrial Radio Access (E-UTRA), Radio Resource Control (RRC), Protocol Specification (3GPP TS 36.331 Version 15.2.1 Release 15)", TS 136 331 V15.2.1, Jun. 2018, pp. 1-790.
Huawei, et al., "Indication of the Max Layers Mimo", R2-165912, 3GPP TSG-RAN WG2 Meeting #95 Gothenburg, Sweden Aug. 22-26, 2016, 3 Pages.
Nokia, et al., "Conflicting Understanding in Interpreting MIMO Capabilities in EN-DC", R2- 1814388 R2-18xxxxx, 3GPP TSG-RAN WG2 Meeting #103bis Chengdu, China, Oct. 8-12, 2018, 3 Pages.
Qualcomm Incorporated: "Remaining Issues on Soft Buffer Management", R1-1802843, 3GPP TSG-RAN WG1 Meeting #Feb. 26-Mar. 2, 2018, Athens, Greece, pp. 1-2.

* cited by examiner

CONFIGURING A MAXIMUM NUMBER OF LAYERS

CROSS REFERENCE

The present Application for Patent is a Continuation of U.S. patent application Ser. No. 16/679,074 by SORIAGA, et al., entitled "CONFIGURING A MAXIMUM NUMBER OF LAYERS" filed Nov. 8, 2019, which claims the benefit of U.S. Provisional Patent Application No. 62/759,952 by SORIAGA, et al., entitled "CONFIGURING A MAXIMUM NUMBER OF LAYERS," filed Nov. 12, 2018, assigned to the assignee hereof, and expressly incorporated herein.

BACKGROUND

The following relates generally to wireless communications, and more specifically to configuring a maximum number of layers.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some examples of a wireless communications system, a UE may report one or more capabilities to a base station. Capabilities may include, for instance, an indication of a number of layers that the UE can use to receive downlink transmissions (e.g., based on the number of antennas at the UE, antenna ports at the UE, processing capabilities at the UE, or the like). UE capabilities may further include an indication of a modulation scheme (e.g., 64 quadrature amplitude modulation (QAM), 256 QAM, etc.) that the UE can support. A UE may have multiple capabilities within a band combination. That is, the UE may be capable of receiving downlink signals using different numbers of layers in combination with different modulation schemes (e.g., using different modulation and coding schemes (MCS)) on the same band, subband, bandwidth part (BWP), or cell. A UE may transmit capability information to a base station in a capability report, and the base station may configure subsequent communications to the UE to stay within the UE capabilities.

SUMMARY

The described techniques relate to improved methods, systems, devices, and apparatuses that support configuring a maximum number of layers. Generally, capability signals from a user equipment (UE) to the network may indicate multiple capability sets for the UE, and may provide for more efficient use of the UE hardware implementation by providing the network with multiple options for operating in data connection within the same hardware envelope. For optimal benefit to the UE implementation, the network should, upon choosing the best option for data connection, indicate to the UE which set of capabilities will be in operation among the multiple sets it has reported. In particular, this includes having the network signal to the UE the value for a radio resource control (RRC) parameter for the maximum number of data streams in a downlink (or uplink) transmission. However, one complication which arises is that a legacy UE may be unable to successfully receive such an RRC parameter Therefore, the techniques described herein introduce this signaling unambiguously between the network and the UEs so that legacy operation is not impacted while non-legacy operation takes advantage of improved hardware utilization.

In some examples, a non-legacy UE may send an indication (e.g., an explicit indication) of its capability to read a parameter that indicates a maximum number of layers (e.g., maxLayer RRC parameter). For instance, one or more bits, information elements, or the like, may be included in the UE capabilities report to indicate whether the UE is capable of reading a maximum layer parameter. Upon receiving a UE capabilities report that indicates that the UE is capable of reading the maximum layer parameter, the base station may send the maximum layer parameter. Since non-legacy UEs provide this indication signal, while legacy UEs would not provide such indication, the network may apply appropriate RRC signaling unambiguously to legacy and non-legacy UEs.

In some examples, the UE may report multiple capabilities for a single band (e.g., subband, bandwidth part (BWP), or other set of frequency resources) combination in its UE capabilities report. The base station may determine, based on the multiple capabilities, that the UE is capable of reading a maximum layer parameter (e.g., an implicit indication derived from the multiple capabilities reported). The base station may then send a maximum layer parameter to the UE, semi-statically updating the capabilities set.

A UE may determine its multiple capabilities sets, and include the capabilities set in a capabilities report. One aspect of the above techniques is that, if absent, the UE may need to be capable of processing a downlink transmission regardless of how the base station interprets the capabilities report. That is, if a UE reports a first capabilities set and a second capabilities set, it may need to be capable of processing downlink signals according to the first capabilities set, or the second capabilities set, and may further need to have sufficient implementation margins to process a maximum layer parameter, and switch between capabilities sets to receive subsequent downlink signals according to the updated capabilities set. Alternatively, the UE may elect to transmit a single capability (e.g., a single maximum number of layers) for a band combination, which limits the flexibility on the network side and may under-utilize the UE hardware.

A method of wireless communication at a UE is described. The method may include transmitting capability information indicating that the UE is capable of receiving, from a base station, an indication of a maximum number of layers that the base station will use to transmit to the UE in at least one set of frequency resources of a radio frequency (RF) spectrum band, receiving, from the base station in response to the transmitted capability information, the indication of the maximum number of layers, and receiving, according to the indicated maximum number of layers, signals from the base station using the at least one set of frequency resources.

An apparatus for wireless communication at a UE is described. The apparatus may include a processor, memory in electronic communication with the processor, and instructions stored in the memory. The instructions may be executable by the processor to cause the apparatus to transmit capability information indicating that the UE is capable of receiving, from a base station, an indication of a maximum number of layers that the base station will use to transmit to the UE in at least one set of frequency resources of an RF spectrum band, receive, from the base station in response to the transmitted capability information, the indication of the maximum number of layers, and receive, according to the indicated maximum number of layers, signals from the base station using the at least one set of frequency resources.

Another apparatus for wireless communication at a UE is described. The apparatus may include means for transmitting capability information indicating that the UE is capable of receiving, from a base station, an indication of a maximum number of layers that the base station will use to transmit to the UE in at least one set of frequency resources of an RF spectrum band, receiving, from the base station in response to the transmitted capability information, the indication of the maximum number of layers, and receiving, according to the indicated maximum number of layers, signals from the base station using the at least one set of frequency resources.

A non-transitory computer-readable medium storing code for wireless communication at a UE is described. The code may include instructions executable by a processor to transmit capability information indicating that the UE is capable of receiving, from a base station, an indication of a maximum number of layers that the base station will use to transmit to the UE in at least one set of frequency resources of an RF spectrum band, receive, from the base station in response to the transmitted capability information, the indication of the maximum number of layers, and receive, according to the indicated maximum number of layers, signals from the base station using the at least one set of frequency resources.

In some examples of the method, apparatuses, and non-transitory computer-readable medium described herein, transmitting the capability information may include operations, features, means, or instructions for transmitting, in the capability information, a parameter value indicating that the UE may be capable of receiving the indication of the maximum number of layers.

In some examples of the method, apparatuses, and non-transitory computer-readable medium described herein, receiving the indication of the maximum number of layers may include operations, features, means, or instructions for receiving radio resource control signaling including a parameter that identifies the maximum number of layers.

Some examples of the method, apparatuses, and non-transitory computer-readable medium described herein may further include operations, features, means, or instructions for configuring, based on the indicated maximum number of layers, a size of a soft buffer at the UE.

Some examples of the method, apparatuses, and non-transitory computer-readable medium described herein may further include operations, features, means, or instructions for selecting, by the UE, a channel state information (CSI) report format based on the indicated maximum number of layers, and transmitting a CSI report to the base station according to the selected CSI report format.

Some examples of the method, apparatuses, and non-transitory computer-readable medium described herein may further include operations, features, means, or instructions for determining, based on the indicated maximum number of layers, a sounding reference signal port sounding configuration, and transmitting sounding reference signals to the base station according to the determined sounding reference signal port sounding configuration.

Some examples of the method, apparatuses, and non-transitory computer-readable medium described herein may further include operations, features, means, or instructions for determining, by the UE, a downlink control information format based on the indicated maximum number of layers, and receiving, from the base station, at least on downlink control information signal according to the determined downlink control information format.

In some examples of the method, apparatuses, and non-transitory computer-readable medium described herein, transmitting the capability information may include operations, features, means, or instructions for transmitting, to the base station, a UE radio access capability parameter indicating that the UE may be capable of receiving the indication of the maximum number of layers.

In some examples of the method, apparatuses, and non-transitory computer-readable medium described herein, the at least one set of frequency resources includes a bandwidth part, or a subband, or a combination thereof, of the RF spectrum band.

In some examples of the method, apparatuses, and non-transitory computer-readable medium described herein, receiving the signals from the base station according to the indicated maximum number of layers may include operations, features, means, or instructions for receiving the signals from the base station using a number of layers equal to or less than the indicated maximum number of layers.

A method of wireless communication at a base station is described. The method may include receiving, from a UE, capability information indicating that the UE is capable of receiving an indication of a maximum number of layers that the base station will use to transmit to the UE in at least one set of frequency resources of an RF spectrum band, transmitting, to the UE in response to the received capability information, the indication of the maximum number of layers, and transmitting, according to the indicated maximum number of layers, signals to the UE using the at least one set of frequency resources.

An apparatus for wireless communication at a base station is described. The apparatus may include a processor, memory in electronic communication with the processor, and instructions stored in the memory. The instructions may be executable by the processor to cause the apparatus to receive, from a UE, capability information indicating that the UE is capable of receiving an indication of a maximum number of layers that the base station will use to transmit to the UE in at least one set of frequency resources of an RF spectrum band, transmit, to the UE in response to the received capability information, the indication of the maximum number of layers, and transmit, according to the indicated maximum number of layers, signals to the UE using the at least one set of frequency resources.

Another apparatus for wireless communication at a base station is described. The apparatus may include means for receiving, from a UE, capability information indicating that the UE is capable of receiving an indication of a maximum number of layers that the base station will use to transmit to the UE in at least one set of frequency resources of an RF spectrum band, transmitting, to the UE in response to the received capability information, the indication of the maximum number of layers, and transmitting, according to the indicated maximum number of layers, signals to the UE using the at least one set of frequency resources.

A non-transitory computer-readable medium storing code for wireless communication at a base station is described. The code may include instructions executable by a processor to receive, from a UE, capability information indicating that the UE is capable of receiving an indication of a maximum number of layers that the base station will use to transmit to the UE in at least one set of frequency resources of an RF spectrum band, transmit, to the UE in response to the received capability information, the indication of the maximum number of layers, and transmit, according to the indicated maximum number of layers, signals to the UE using the at least one set of frequency resources.

In some examples of the method, apparatuses, and non-transitory computer-readable medium described herein, receiving the capability information may include operations, features, means, or instructions for receiving, with the capability information, a parameter value indicating that the UE may be capable of receiving the indication of the maximum number of layers.

In some examples of the method, apparatuses, and non-transitory computer-readable medium described herein, transmitting the indication of the maximum number of layers may include operations, features, means, or instructions for transmitting radio resource control signaling including a parameter that identifies the maximum number of layers.

Some examples of the method, apparatuses, and non-transitory computer-readable medium described herein may further include operations, features, means, or instructions for determining a downlink control information format for the UE based on the maximum number of layers, and transmitting, to the UE, at least on downlink control information signal according to the determined downlink control information format.

In some examples of the method, apparatuses, and non-transitory computer-readable medium described herein, receiving the capability information may include operations, features, means, or instructions for receiving, from the UE, a UE radio access capability parameter indicating that the UE may be capable of receiving the indication of the maximum number of layers.

In some examples of the method, apparatuses, and non-transitory computer-readable medium described herein, the at least one set of frequency resources includes a bandwidth part, or a subband, or a combination thereof, of the RF spectrum band.

In some examples of the method, apparatuses, and non-transitory computer-readable medium described herein, transmitting the signals to the UE according to the indicated maximum number of layers may include operations, features, means, or instructions for transmitting the signals to the UE using a number of layers equal to or less than the indicated maximum number of layers.

A method of wireless communication at a UE is described. The method may include identifying two or more sets of values for a maximum number of layers a UE is capable of receiving from a base station for a first set of frequency resources of at least one set of frequency resources, transmitting, to the base station and in the capability information, two or more sets of values for the maximum number of layers a UE is capable of receiving for a first set of frequency resources of the at least one set of frequency resources, receiving, from the base station in response to the transmitted capability information, the indication of the maximum number of layers, and receiving, according to the indicated maximum number of layers, signals from the base station using the at least one set of frequency resources.

An apparatus for wireless communication at a UE is described. The apparatus may include a processor, memory in electronic communication with the processor, and instructions stored in the memory. The instructions may be executable by the processor to cause the apparatus to identify two or more sets of values for a maximum number of layers a UE is capable of receiving from a base station for a first set of frequency resources of at least one set of frequency resources, transmit, to the base station and in the capability information, two or more sets of values for the maximum number of layers a UE is capable of receiving for a first set of frequency resources of the at least one set of frequency resources, receive, from the base station in response to the transmitted capability information, the indication of the maximum number of layers, and receive, according to the indicated maximum number of layers, signals from the base station using the at least one set of frequency resources.

Another apparatus for wireless communication at a UE is described. The apparatus may include means for identifying two or more sets of values for a maximum number of layers a UE is capable of receiving from a base station for a first set of frequency resources of at least one set of frequency resources, transmitting, to the base station and in the capability information, two or more sets of values for the maximum number of layers a UE is capable of receiving for a first set of frequency resources of the at least one set of frequency resources, receiving, from the base station in response to the transmitted capability information, the indication of the maximum number of layers, and receiving, according to the indicated maximum number of layers, signals from the base station using the at least one set of frequency resources.

A non-transitory computer-readable medium storing code for wireless communication at a UE is described. The code may include instructions executable by a processor to identify two or more sets of values for a maximum number of layers a UE is capable of receiving from a base station for a first set of frequency resources of at least one set of frequency resources, transmit, to the base station and in the capability information, two or more sets of values for the maximum number of layers a UE is capable of receiving for a first set of frequency resources of the at least one set of frequency resources, receive, from the base station in response to the transmitted capability information, the indication of the maximum number of layers, and receive, according to the indicated maximum number of layers, signals from the base station using the at least one set of frequency resources.

In some examples of the method, apparatuses, and non-transitory computer-readable medium described herein, the at least one communication parameter includes a number of layers, or a modulation scheme, or a coding scheme, or a modulation and coding scheme, or a combination thereof.

In some examples of the method, apparatuses, and non-transitory computer-readable medium described herein, receiving the indication of the maximum number of layers may include operations, features, means, or instructions for receiving radio resource control signaling including a parameter that identifies the maximum number of layers.

Some examples of the method, apparatuses, and non-transitory computer-readable medium described herein may further include operations, features, means, or instructions for configuring, based on the indicated maximum number of layers, a size of a soft buffer at the UE.

Some examples of the method, apparatuses, and non-transitory computer-readable medium described herein may further include operations, features, means, or instructions for selecting, by the UE, a CSI report format based on the indicated maximum number of layers, and transmitting a CSI report to the base station according to the selected CSI report format.

Some examples of the method, apparatuses, and non-transitory computer-readable medium described herein may further include operations, features, means, or instructions for determining, based on the indicated maximum number of layers, a sounding reference signal port sounding configuration, and transmitting sounding reference signals to the base station according to the determined sounding reference signal port sounding configuration.

Some examples of the method, apparatuses, and non-transitory computer-readable medium described herein may further include operations, features, means, or instructions for determining, by the UE, a downlink control information format based on the indicated maximum number of layers, and receiving, from the base station, at least on downlink control information signal according to the determined downlink control information format.

In some examples of the method, apparatuses, and non-transitory computer-readable medium described herein, transmitting the capability information may include operations, features, means, or instructions for transmitting, to the base station, a UE radio access capability parameter indicating that the UE may be capable of receiving the indication of the maximum number of layers.

In some examples of the method, apparatuses, and non-transitory computer-readable medium described herein, the at least one set of frequency resources includes a bandwidth part, or a subband, or a combination thereof, of the RF spectrum band.

In some examples of the method, apparatuses, and non-transitory computer-readable medium described herein, receiving the signals from the base station according to the indicated maximum number of layers may include operations, features, means, or instructions for receiving the signals from the base station using a number of layers equal to or less than the indicated maximum number of layers.

A method of wireless communication at a base station is described. The method may include receiving, from a UE, capability including two or more sets of values of at least one communication parameter for a first set of frequency resources of at least one set of frequency resources, determining, based on the received two or more sets of values of the at least one communication parameter, that the UE is capable of receiving the indication of the maximum number of layers, transmitting, to the UE in response to the received capability information and based on the determining that the UE is capable of receiving the indication of the maximum number of layers, the indication of the maximum number of layers, and transmitting, according to the indicated maximum number of layers, signals to the UE using the at least one set of frequency resources.

An apparatus for wireless communication at a base station is described. The apparatus may include a processor, memory in electronic communication with the processor, and instructions stored in the memory. The instructions may be executable by the processor to cause the apparatus to receive, from a UE, capability including two or more sets of values of at least one communication parameter for a first set of frequency resources of at least one set of frequency resources, determine, based on the received two or more sets of values of the at least one communication parameter, that the UE is capable of receiving the indication of the maximum number of layers, transmit, to the UE in response to the received capability information and based on the determining that the UE is capable of receiving the indication of the maximum number of layers, the indication of the maximum number of layers, and transmit, according to the indicated maximum number of layers, signals to the UE using the at least one set of frequency resources.

Another apparatus for wireless communication at a base station is described. The apparatus may include means for receiving, from a UE, capability including two or more sets of values of at least one communication parameter for a first set of frequency resources of at least one set of frequency resources, determining, based on the received two or more sets of values of the at least one communication parameter, that the UE is capable of receiving the indication of the maximum number of layers, transmitting, to the UE in response to the received capability information and based on the determining that the UE is capable of receiving the indication of the maximum number of layers, the indication of the maximum number of layers, and transmitting, according to the indicated maximum number of layers, signals to the UE using the at least one set of frequency resources.

A non-transitory computer-readable medium storing code for wireless communication at a base station is described. The code may include instructions executable by a processor to receive, from a UE, capability including two or more sets of values of at least one communication parameter for a first set of frequency resources of at least one set of frequency resources, determine, based on the received two or more sets of values of the at least one communication parameter, that the UE is capable of receiving the indication of the maximum number of layers, transmit, to the UE in response to the received capability information and based on the determining that the UE is capable of receiving the indication of the maximum number of layers, the indication of the maximum number of layers, and transmit, according to the indicated maximum number of layers, signals to the UE using the at least one set of frequency resources.

In some examples of the method, apparatuses, and non-transitory computer-readable medium described herein, the at least one communication parameter includes a number of layers, or a modulation scheme, or a coding scheme, or a modulation and coding scheme, or a combination thereof.

In some examples of the method, apparatuses, and non-transitory computer-readable medium described herein, transmitting the indication of the maximum number of layers may include operations, features, means, or instructions for transmitting radio resource control signaling including a parameter that identifies the maximum number of layers.

Some examples of the method, apparatuses, and non-transitory computer-readable medium described herein may further include operations, features, means, or instructions for determining a downlink control information format for the UE based on the maximum number of layers, and transmitting, to the UE, at least on downlink control information signal according to the determined downlink control information format.

In some examples of the method, apparatuses, and non-transitory computer-readable medium described herein, receiving the capability information may include operations, features, means, or instructions for receiving, from the UE, a UE radio access capability parameter indicating that the UE may be capable of receiving the indication of the maximum number of layers.

In some examples of the method, apparatuses, and non-transitory computer-readable medium described herein, the at least one set of frequency resources includes a bandwidth part, or a subband, or a combination thereof, of the RF spectrum band.

In some examples of the method, apparatuses, and non-transitory computer-readable medium described herein, transmitting the signals to the UE according to the indicated maximum number of layers may include operations, features, means, or instructions for transmitting the signals to the UE using a number of layers equal to or less than the indicated maximum number of layers.

DETAILED DESCRIPTION

Figure 1:
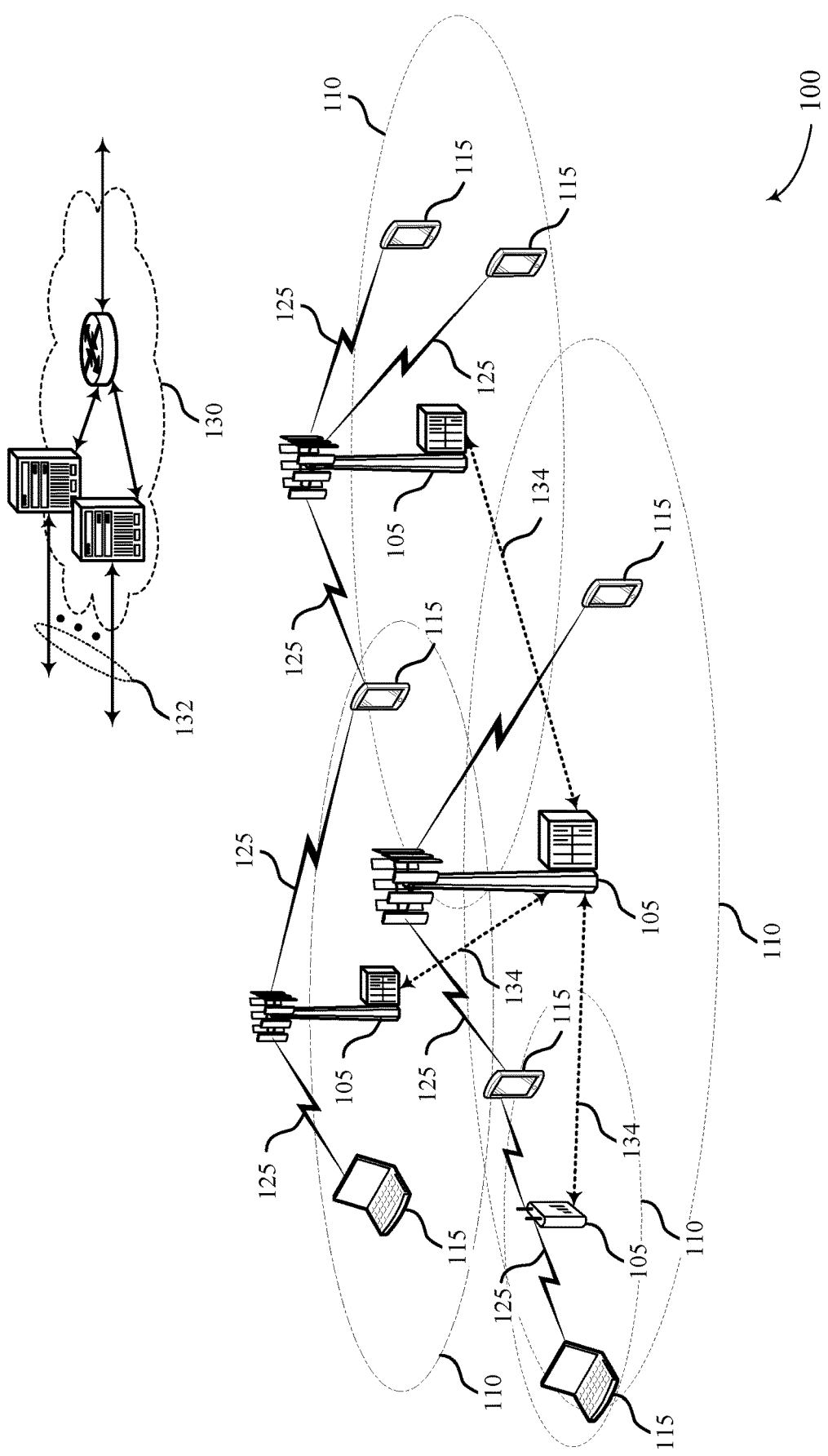
FIG. 1 illustrates an example of a system for wireless communications that supports configuring a maximum number of layers in accordance with aspects of the present disclosure.

In some examples of a wireless communications system, a user equipment (UE) may report one or more capabilities to a base station. Capabilities may include, for instance, an indication of a number of layers that the UE can use to receive downlink transmissions (e.g., based on the number of antennas at the UE, antenna ports at the UE, processing capabilities at the UE, or the like). Layer mapping may be used for multiple input multiple output (MIMO) communications, spatial multiplexing, or the like. The number of layers the UE is capable of using may refer to a number of data streams the UE is capable of receiving in parallel. A base station may receive reported UE capabilities from a UE, and may schedule subsequent communications with the UE such that a transmission rank (e.g., a number of layers) does not exceed the UE capacity. That is, the base station may indicate to the UE a maximum number of data streams in a downlink (or uplink) transmission that the base station will use for subsequent downlink (or uplink) transmissions. Such indication may include an upper limit on the number of layers (e.g., 4 layers max, or 8 layers max, etc.), or indicate a set of layers that the base station may use that does not exceed some threshold number of layers (e.g., 2 or 4 layers) that the base station may otherwise have the capability to utilize (e.g., the set of 2 or 4 layers excluding 8 layers). UE capabilities may further include an indication of a modulation scheme (e.g., 64 quadrature amplitude modulation (QAM), 256 QAM, etc.) that the UE can support. A UE may have multiple capabilities within a band combination (e.g., one or more sets of frequency resources such as a band, subband, bandwidth part (BWP), sub-channel, or the like). For instance, a UE may be capable of receiving downlink transmissions using four layers and 64 QAM on a first band, or may be capable of receiving downlink transmissions using two layers and 256 QAM on the first band. Similarly, the UE may operate in a carrier aggregation mode, and may be capable of receiving downlink transmissions on a first band using four layers and a second band using two layers, or may be capable of receiving downlink transmissions using two layers on the first band and four layers on the second band.

Transmitting a UE capability set to the network may allow the UE to signal baseband restrictions or radio frequency restrictions to the network, while also providing flexibility in configuration that efficiently utilizes the hardware implementation at a UE by providing the network with multiple options for operating in data connection within the same hardware envelope.

In some examples, a base station may receive a UE capabilities report and determine UE capabilities during an initial communication of an attachment procedure (e.g., a random access channel (RACH) procedure, handover, or the like) and the network may subsequently communicate with the UE based on the initial UE capabilities report, despite the fact that the UE is capable of communicating using different combinations of capabilities (e.g., capability sets). For instance, the UE may be capable of communicating on a first band using four layers and 64 QAM (e.g., capability set 1). The UE may also be capable of communicating on the first band using two layers and 256 QAM (e.g., capability set 2). However, the UE may not be capable of communicating on the first band using four layers and 256 QAM. The network may initially configure the UE with capability set 1 (e.g., restrict operation to four layers and 64 QAM). The network may subsequently configure the UE to receive downlink transmissions using two layers and 256 QAM. However, based on the original configuration the UE may be prepared to communicate using four layers. For instance, the UE may be prepared to send four layer channel state information (CSI) reports, four layer limited buffer rate matching (LBRM), etc.

In some cases, capability signals from the UE to the base station may indicate multiple capability sets for the UE, and may provide for more efficient use of hardware implementation by providing the network with multiple options for operating in data connection within the same hardware envelope. For optimal benefit to the UE implementation, the network should, upon choosing the best option for data connection, indicate to the UE which set of capabilities will be in operation among the multiple sets it has reported. In particular, this includes having the network signal to the UE the value for a radio resource control (RRC) parameter for the maximum number of data streams in a downlink (or uplink) transmission. However, one complication which arises is that a legacy UE may not be able to successfully receive such an RRC parameter. That is, there may be backward compatibility issues if previously configured behavior is modified dependent on an RRC parameter for a maximum number of layers, but a legacy UE is unable to read the RRC parameter. Therefore, the techniques described herein introduce this signaling unambiguously between the network and the UEs so that legacy operation is not impacted while non-legacy operation takes advantage of improved hardware utilization In some examples, a legacy UE may refer to a device that does not support the described features and techniques but nonetheless operate in the same wireless communication system, and a non-legacy UE may refer to a device that supports the described features and techniques described herein. In some examples, the CSI reporting may be modified to follow a maximum layer RRC parameter for LBRM (as described in greater detail with respect to FIGS. 2 and 3). However, legacy devices may not be able to read the signal, and may use LBRM, but a network may not be able to distinguish legacy UEs from non-legacy UEs.

In some examples, the base station may initially configure a legacy UE to operate under capability set 1 (e.g. using four layers). Then, the base station may send an RRC signal indicating a change to capability set 2 (e.g., using two layers). The base station may expect a CSI report up to rank 2, based on capability set 2. However, if the legacy UE did not successfully receive the RRC signal, then the UE may send a CSI report up to rank 4. This may result in a reading mismatch, and unsuccessful or inefficient CSI reporting, which may in turn result in increased overhead (e.g., resending unsuccessfully received messages), increased latency, and decreased user experience. However, an RRC parameter indicating a maximum number of layers (e.g., a maximum number of data streams to be used in subsequent downlink transmissions) may be used by non-legacy UEs to improve efficiency.

In some examples, a non-legacy UE may send an explicit indication of its capability to read a maximum layer RRC parameter (e.g., maxLayer RRC parameter). For instance, one or more bits, information elements, or the like, may be included in the UE capabilities report to indicate whether the UE is capable of reading a maximum layer RRC parameter. Upon receiving a UE capabilities report that indicates that the UE is capable of reading the maximum layer RRC parameter, the base station may send the maximum layer RRC parameter. That is, instead of continuing to send downlink transmissions according to an initially configured maximum number of layers (e.g., a maximum number of data streams for downlink transmissions) the base station may periodically (e.g., semi-statically) update a maximum layer value. This may allow the UE to avoid inefficiently continuing to use an initially configured capabilities set. It may also allow the UE to receive downlink transmissions using a lower number of layers during certain time periods, and only receive downlink transmissions (or transmit uplink transmissions such as CSI reports) with higher complexity when configured by the base station, resulting in increased processing efficiency. Since non-legacy UEs provide this indication signal, while legacy UEs would not provide such indication, the network may apply appropriate RRC signaling unambiguously to legacy and non-legacy UEs In contrast, legacy UEs may not send capabilities reports that include an indication that they are capable of reading a maximum layer RRC parameter. That is, a legacy UE may not include any indication of its ability to read additional RRC parameters. A receiving base station may determine that the UE has not sent any such indication. A base station may be required (e.g., by a 3GPP standard) to only configure and send a maximum layer RRC parameter if the UE supports such a parameter (e.g., if the UE is a non-legacy UE). In cases where the UE does not indicate that it can read a maximum layer RRC parameter, the base station may default to the assumption that the UE cannot read the parameter. In such cases, the base station may default to an maximum number of layers that was previously configured by the base station in response to a UE capabilities report (e.g., during a RACH procedure, a handover procedure, or the like), instead of periodically or periodically (e.g., semi-statically) updating the capabilities set for a UE while to UE is connected with the base station based on received RRC signaling from the UE.

In some examples, the base station may determine that the UE has ambiguous capabilities. The UE may report multiple capabilities for a single band combination in its UE capabilities report. The base station may determine, based on the multiple capabilities, that the UE is capable of reading a maximum layer RRC parameter (e.g., an implicit indication derived from the multiple capabilities reported). The base station may then send a maximum layer RRC parameter to the UE, periodically or aperiodically while the UE is connected (e.g., semi-statically) updating the capabilities set for a UE based on received signaling from the UE. A UE may determine its multiple capabilities sets. One aspect of the above techniques is that, if absent, the UE may also need to be capable of processing a downlink transmission regardless of how the base station interprets the capabilities report. That is, if a UE reports a first capabilities set and a second capabilities set, the UE may need to be capable of processing downlink signals according to the first capabilities set, or the second capabilities set, and may further need to have sufficient implementation margins to process a maximum layer RRC parameter, and switch between capabilities sets to receive subsequent downlink signals according to the updated capabilities set. Upon making such determinations, the UE may transmit a capabilities report including (e.g., identifying or otherwise indicating) the multiple capabilities. Alternatively, the UE may elect to only transmit a single capability (e.g., a single maximum number of layers for a band combination), which limits the flexibility on the network side and may under-utilize the UE hardware.

If the base station receives only one UE capability from a UE associated with a particular band, it may determine that the UE is not capable of successfully receiving a maximum layer RRC parameter, and may refrain from sending the parameter or otherwise attempt to update the capabilities set for a UE based on received capabilities signals (e.g., a capabilities report) from the UE. Similarly, a legacy UE may transmit a single capability to the UE. A base station may be required (e.g., by a 3GPP standard) to only configure and send a maximum layer RRC parameter if the UE supports such a parameter (e.g., if the UE is a non-legacy UE). In cases where the UE does not indicate that it can read a maximum layer RRC parameter, the base station may default to the assumption that the UE cannot read the parameter. In such examples, the base station may default to an initially configured maximum number of layers, instead of updating the capabilities set for a UE based on received capability signals from the UE (e.g., a capabilities report from the UE).

Particular aspects of the subject matter described herein may be implemented to realize one or more advantages. The described techniques may support improvements in system efficiency such that a device may avoid inefficiently continuing to use an initially configured capabilities set and instead us a maximum number of layers in a variety of scenarios. It may also allow a device to receive downlink transmissions using a lower number of layers during certain time periods, and only receive downlink transmissions (or transmit uplink transmissions such as CSI reports) with higher complexity when configured by the base station, resulting in increased processing efficiency. The described techniques may also promote backward compatibility with legacy devices, such as legacy UEs, allowing for greater flexibility in the network and support for a greater number of devices. As such, supported techniques may include improved network operations and, in some examples, may promote device and network efficiencies, among other benefits.

Aspects of the disclosure are initially described in the context of a wireless communications system. Aspects of the disclosure are further illustrated by and described with reference to process flows, apparatus diagrams, system diagrams, and flowcharts that relate to configuring a maximum number of layers.

FIG. 1 illustrates an example of a wireless communications system 100 that supports configuring a maximum number of layers in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (D2D), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the D2D. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some examples, a non-legacy UE 115 may send an explicit indication of its capability to read a maximum layer RRC parameter (e.g., maxLayer RRC parameter). For instance, one or more bits, information elements, or the like, may be included in the UE capabilities report to indicate whether the UE 115 is capable of reading a maximum layer RRC parameter. Upon receiving a UE capabilities report that indicates that the UE 115 is capable of reading the maximum layer RRC parameter, the base station 105 may send the maximum layer RRC parameter. Since non-legacy UEs 115 provide this indication signal, while legacy UEs would not provide such indication, the network may apply appropriate RRC signaling unambiguously to legacy and non-legacy UEs 115.

In some examples, the UE 115 may report multiple capabilities for a single band combination in its UE capabilities report. The base station 105 may determine, based on the multiple capabilities, that the UE 115 has ambiguous capabilities, and is capable of reading a maximum layer RRC parameter (e.g., an implicit indication derived from the multiple capabilities reported). The base station may then send a maximum layer RRC parameter to the UE 115, updating the capabilities set for a UE based on received signaling from the UE. For UE 115 may determine multiple capabilities sets, and include the capabilities set in a capabilities signaling (e.g., a UE capabilities report). One aspect of the above technique is that, if absent, UE 115 may need to be capable of processing a downlink transmission regardless of how the base station 105 interprets the capabilities report. That is, if a UE 115 reports a first capabilities set and a second capabilities set, it may need to be capable of processing downlink signals according to the first capabilities set, or the second capabilities set, and may further need to have sufficient implementation margins to process a maximum layer RRC parameter, and switch between capabilities sets to receive subsequent downlink signals according to the updated capabilities set. Alternatively, the UE 115 may elect to only transmit a single capability (e.g., a single maximum number of layers for a band combination), which limits the flexibility on the network side and may underutilize the UE hardware.

Figure 2:
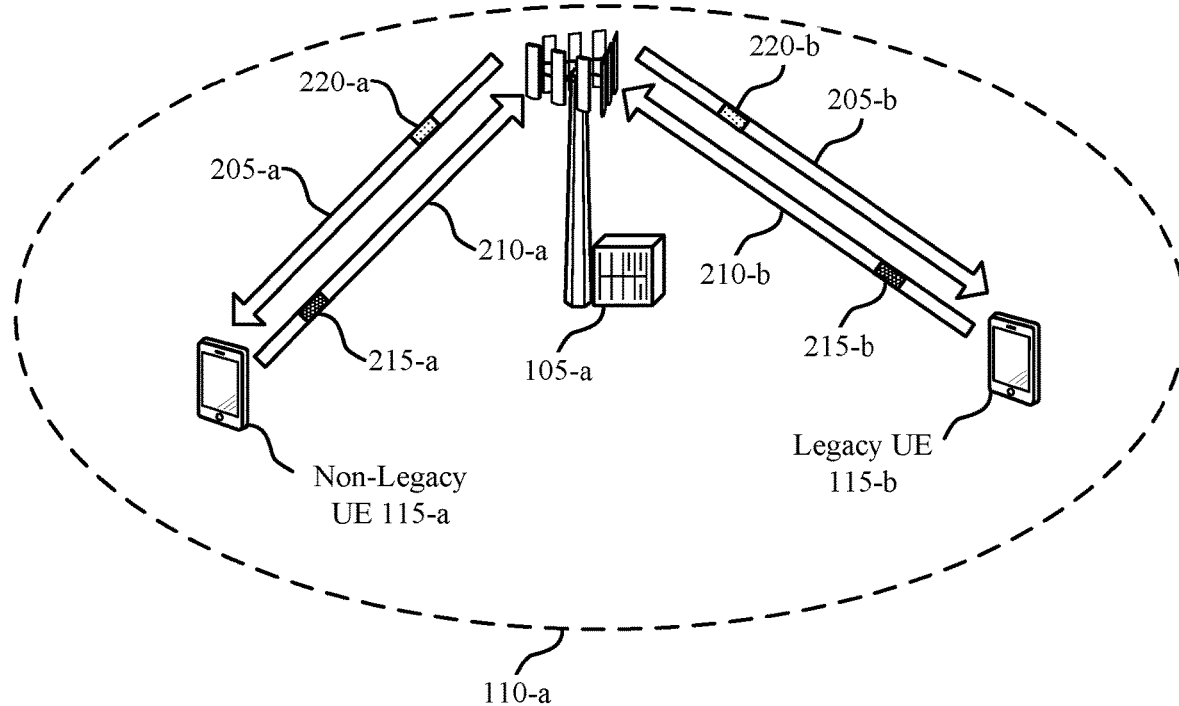
FIG. 2 illustrates an example of a wireless communications system that supports configuring a maximum number of layers in accordance with aspects of the present disclosure.

FIG. 2 illustrates an example of a wireless communications system 200 that supports configuring a maximum number of layers in accordance with aspects of the present disclosure. In some examples, wireless communications system 200 may implement aspects of wireless communications system 100. Wireless communications system 200 may include a base station 105-a, a non-legacy UE 115-a and a legacy UE 115-b, which may be examples of corresponding devices illustrated and described with respect to wireless communications system 100.

In some examples of wireless communications system 200, a base station 105-a may serve one or more UEs 115 that are located within a geographic coverage area. In some cases, base station 105-a may serve one or more UEs 115 that do not support one or more of the features described herein (which in some cases may be referred to as legacy UEs) and one or more UEs 115 that support one or more of the features described herein (which in some cases may be referred to as non-legacy UEs). For instance, non-legacy UE 115-a (a non-legacy device) may be capable of updated or additional signaling that legacy UE 115-b does not support. Base station 105-a may communicate with UEs 115 via downlink 205-a and downlink 205-b. non-legacy UE 115-a may communicate with base station 105-b via uplink 210-a, and legacy UE 115-b may communicate with base station 105-a via uplink 210-b.

In some examples, a UE 115 (e.g., non-legacy UE 115-a or legacy UE 115-b) may report one or more capabilities to a base station 105-a. Non-legacy UE 115-a may transmit capabilities report 215-a to base station 105-a via uplink 210-a, and legacy UE 115-b may transmit capabilities report 215-b via uplink 210-b. Capabilities included in a capabilities report 215 may include, for instance, an indication of a number of layers that the UE 115 can use to receive downlink transmissions (e.g., based on the number of antennas at the UE 115, antenna ports at the UE 115, processing capabilities at the UE 115, or the like). Layer mapping may be used for multiple input multiple output (MIMO) communications, transmit diversity, spatial multiplexing, or the like. The number of layers the UE 115 is capable of using may refer to a number of data streams the UE 115 is capable of receiving in parallel. Base station 105-a may receive reported UE capabilities from a UE 115, and may schedule subsequent communications with the UE 115 such that a transmission rank (e.g., a number of layers) does not exceed the UE capacity. A capabilities report 215 may further include an indication of a modulation and coding scheme (MCS) (e.g., a modulation scheme such as 64 quadrature amplitude modulation (QAM), 256 QAM, etc.) that the UE 115 can support. A UE 115 may have multiple capabilities within a band combination. For instance, a UE 115 may be capable of receiving downlink transmissions using four layers and 64 QAM on a first band, or may be capable of receiving downlink transmissions using two layers and 256 QAM on the first band. Similarly, the UE 115 may operate in a carrier aggregation mode. For example, in a carrier aggregation mode, UE 115 may be capable of receiving downlink 205 on a first band (e.g., a subband, a BWP, a sub-channel, or other sets or subsets of frequency resources of an operating bandwidth, such as a carrier, of the base station) using four layers and a second band using two layers may be capable of receiving downlink 205 using two layers on the first band and four layers on the second band. Transmitting a UE capabilities report 215 to the network may allow for signaling of baseband restrictions or radio frequency restrictions to the network. For example, a low cost or low power UEs may benefit from receiving simplified (e.g., less complex) transmissions using a smaller number of layers, but may be capable of receiving more complicated downlink transmissions. UE capabilities reports may also providing flexibility in configuration that efficiently utilizes the hardware implementation of a UE 115 by providing the network with multiple options for operating in data connection within the same hardware envelope. For optimal benefit to the UE implementation, the network should, upon choosing the best option for data connection, indicate to the UE 115 which set of capabilities will be in operation among the multiple sets it has reported. In particular, this includes having the network signal to the UE the value for an RRC parameter for the maximum number of data streams in a downlink (or uplink) transmission. Techniques described herein introduce this signaling unambiguously between the network and the UEs so that legacy operation is not impacted while non-legacy operation takes advantage of improved hardware utilization In some examples, base station 105-a may receive a UE capabilities report 215 and determine UE capabilities during an initial communication (e.g., a RACH procedure, handover, or the like) and the network may subsequently communicate based on the initial UE capabilities report, despite the fact that the UE 115 is capable of communicating using different combinations of capabilities (e.g., capability sets). For instance, non-legacy UE 115-a may be capable of communicating on a first band using four layers and 64 QAM (e.g., capability set 1). non-legacy UE 115-a may also be capable of communicating on the first band using two layers and 256 QAM (e.g., capability set 2). However, non-legacy UE 115-a may not be capable of communicating on the first band using four layers and 256 QAM. Base station 105-a (or another network device) may configure non-legacy UE 115-a with capability set 2 (e.g., restrict operation to two layers and 256 QAM). However, in some cases, non-legacy UE 115-a may be capable of or prepared to communicate using four layers, based on a maximum number of layers initially configured (e.g., during a RACH procedure, a handover procedure, or the like). In such cases, despite a signal (e.g., an RRC signal) indicating the capability set 2, non-legacy UE 115-a may be prepared to send four layer CSI reports, four layer LBRM, etc.

In some cases, a semi-static signal (e.g., RRC message 220-a) may carry a parameter indicating a maximum number of layers the base station will use in sending transmissions on downlink 205. However, a legacy UE 115-b may not be able to successfully receive such RRC parameters. For instance, base station 105-a may initially configure legacy UE 115-b to operate under capability set 1 (e.g. using four layers). Then, base station 105-a may send an RRC message 220, which may include an RRC message indicating a maximum number of layers it will use (e.g., capabilities set 2, using two layers). Base station 105-a may expect a CSI report up to rank 2, based on capability set 2. However, if legacy UE 115-b did not successfully receive the RRC parameter included in RRC message 220-a, then legacy UE 1150b may send a CSI report up to rank 4. This may result in a reading mismatch at base station 105-a, and unsuccessful or inefficient CSI reporting, which may in turn result in increased overhead (e.g., resending unsuccessfully received messages), increased latency, and decreased user experience. However, an RRC parameter indicating a maximum number of layers the base station 105-a will use (e.g., maximum rank) may be used by non-legacy UEs 115-a to improve efficiency.

In some examples, non-legacy UE 115-a may send an explicit indication of its capability to read a maximum layer RRC parameter (e.g., maxLayer RRC parameter). For instance, a new bit may be included in the UE capabilities report 215-a. The new bit may indicate whether non-legacy UE 115-a is capable of reading a maximum layer RRC parameter. Upon receiving UE capabilities report 215-a from non-legacy UE 115-a, base station 105-a may determine that non-legacy UE 115-a is capable of reading the maximum layer RRC parameter. Base station 105-a may include the maximum layer RRC parameter in RRC message 220-a, and may update (e.g., semi-statically) the capabilities set for a UE based on received RRC signaling from the UE. This may allow non-legacy UE 115-a to avoid inefficiently continuing to use an initially configured capabilities set. It may also allow the UE to avoid inefficiently adjusting capability sets dynamically. Since non-legacy UEs 115-a provide this indication signal, while legacy UEs 115-b would not provide such indication, the network may apply appropriate RRC signaling unambiguously to legacy UEs 115-a and non-legacy UEs 115-b.

Legacy UE 115-b may not include an indication that they are capable of reading a maximum layer RRC parameter in UE capabilities report 215-b. Base station 105-a may determine that legacy UE 115-b has not sent any such indication in capabilities report 215-b, and may default to the assumption that legacy UE 115-b cannot read the parameter. In such cases, base station 105-b may default to an initially configured maximum number of layers, instead of updating (e.g., semi-statically) the maximum number of layers for a UE based on received RRC signaling from the UE.

In some examples, base station 105-a may determine that non-legacy UE 115-a has ambiguous capabilities. That is, non-legacy UE 115-a may report multiple capabilities in its UE capabilities report 215-a. Base station 105-a may determine, based on the multiple capabilities, that non-legacy UE 115-a is capable of reading a maximum layer RRC parameter (e.g., an implicit indication derived from the multiple capabilities reported). Base station 105-a may then send a maximum layer RRC parameter to the UE in RRC message 220-a, semi-statically updating a maximum number of layers to be used by base station 105-a. non-legacy UE 115-a may determine its multiple capabilities sets, and may determine that it has sufficient processing capacity and implementation margins to switch between capability sets. Upon making such determinations, non-legacy UE 115-a may transmit a capabilities report 215-a including the multiple capabilities. Alternatively, if non-legacy UE 115-a determines that it does not have the capacity to semi-statically adjust between multiple capabilities sets, or if non-legacy UE 115-a determines that it does not have multiple capabilities sets, then non-legacy UE 115-a may elect to only transmit a single capability (e.g., a single maximum number of layers for a band combination). If base station 105-a receives only one UE capability in UE capabilities report 215-b from a legacy UE 115-b, it may determine that legacy UE 115-b is not capable of successfully receiving a maximum layer RRC parameter in RRC message 220-b (e.g., that legacy UE 115-b is a legacy device), and may refrain from sending the maximum layer RRC parameter in RRC message 220-b (e.g., periodically (e.g., semi-statically) updating a maximum number of layers for a UE based on received RRC signaling from the UE. Similarly, a legacy UE 115-b may transmit a single capability in UE capabilities report 215-b, and base station 105-a may default to an initially configured maximum number of layers, instead of updating (e.g., semi-statically) the maximum number of layers for a UE based on received RRC signaling from the UE.

If non-legacy UE 115-a receives the maximum layer RRC parameter in RRC message 220-b, then non-legacy UE 115-a may conform to the received maximum layer RRC parameter for all procedures related thereto. For example, LBRM procedures CSI reporting, sounding reference signal (SRS) port sounding, downlink control information (DCI) field size, and the like, may all be performed in conformance with the maximum number of layers to be used by base station 105-a as indicated in the maximum layer RRC parameter. That is, in some examples, base station 105-a may send subsequent downlink transmissions to non-legacy UE 115-a based on an updated maximum number of layers based on the maximum layer RRC parameter. For instance, non-legacy UE 115-a may continue to receive, according to the indicated maximum number of layers, signals from base station 105-b. In some examples, legacy UE 115-b may not be able to read the maximum layer RRC parameter, and will use LBRM, but the network may not be able to distinguish a legacy UE 115-b from a non-legacy UE 115-a. In some examples, a non-legacy UE 115-a that can read the maximum layer RRC parameter may configure a size of a soft buffer at non-legacy UE 115-a based on the maximum layer RRC parameter.

Communication may also include UE 115-a selecting a CSI report format based at least in part on the maximum layer RRC parameter, and transmitting a CSI report to base station 105-a according to the selected CSI report format. In some examples, non-legacy UE 115-a may determine, based on the maximum layer RRC parameter, a sounding reference signal port sounding configuration, and may transmit sounding reference signals to base station 105-a according to the determined sounding reference signal port sounding configuration. In some examples, non-legacy UE 115-a may determine a DCI format based on the maximum number of layers, and may receive one or more DCI signals from base station 105-a based on the determined DCI format.

Figure 3:
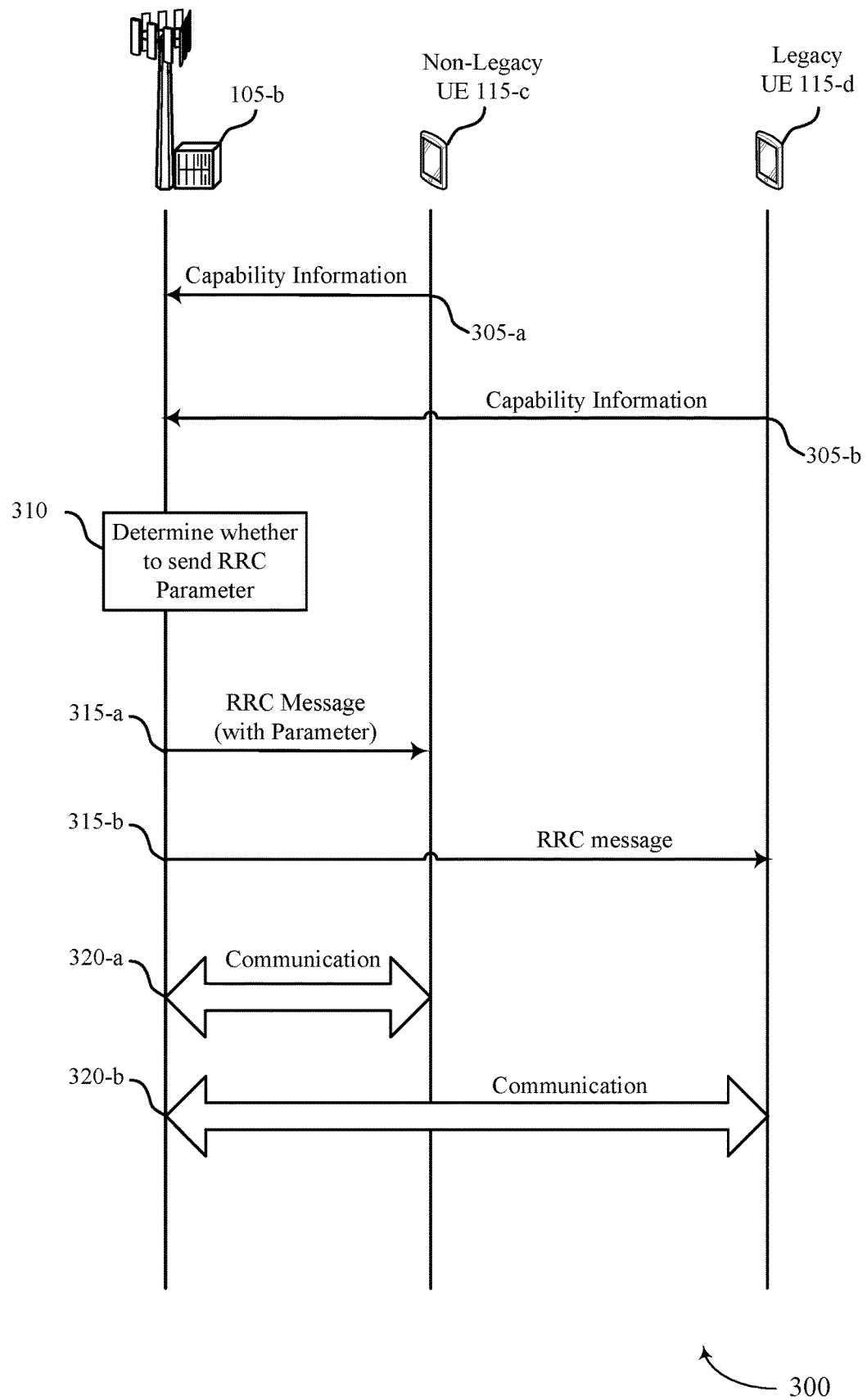
FIG. 3 illustrates an example of a process flow that supports configuring a maximum number of layers in accordance with aspects of the present disclosure.

FIG. 3 illustrates an example of a process flow 300 that supports configuring a maximum number of layers in accordance with aspects of the present disclosure. In some examples, process flow 300 may implement aspects of wireless communications system 100. Process flow 300 may be implemented by a base station 105-b and a non-legacy UE 115-c and a legacy UE 115-d, which may be examples of corresponding device illustrated and described with respect to wireless communications system 100 and wireless communications system 200.

At 305-a, non-legacy UE 115-c may transmit capability information indicating that non-legacy UE 115-c is capable of receiving, from base station 105-b, an indication of a maximum number of layers (e.g., a maximum layers RRC parameter) that base station 105-b will use to transmit to non-legacy UE 115-c in at least one set of frequency resources of a radio frequency (RF) spectrum band. The capability information may be in the form of a capabilities report to base station 105-b. Non-legacy UE 115-c may be a non-legacy device, capable of receiving a maximum layer RRC parameter. Non-legacy UE 115-c may be capable of communication on a band, subband, BWP, cell, or the like, using different numbers of layers or different modulation schemes.

In one example, the capabilities report at 305-a may include an explicit indication that non-legacy UE 115-c is capable of reading a maximum layer RRC parameter. For instance, non-legacy UE 115-c may use an additional bit in the capabilities report to indicate that it is capable of reading the maximum layer RRC parameter. Since non-legacy UEs 115-c provide this indication signal, while legacy UEs 115-d would not provide such indication, the network may apply appropriate RRC signaling unambiguously to legacy UE 115-c and non-legacy UE 115-d.

In one example, the capabilities report at 305-a may merely include ambiguous capabilities (e.g., multiple capabilities for each available band combination). In some examples, non-legacy UE 115-c may report its multiple capabilities (e.g., non-legacy UE 115-c may be capable of receiving downlink transmissions using four layers and 64 QAM on a first band, or may be capable of receiving downlink transmissions using two layers and 256QAM on the first band, or may operate in a carrier aggregation mode, and may be capable of receiving downlink transmissions on a first band using four layers and a second band using two layers, or may be capable of receiving downlink transmissions using two layers on the first band and four layers on the second band, etc.). The indication of ambiguous capabilities may be sufficient to indicate to base station 105-b that non-legacy UE 115-c is capable of receiving a maximum layer RRC parameter (e.g., an implicit indication derived from the multiple capabilities reported).

Non-legacy UE 115-c may determine that it has multiple capabilities sets, and may determine that it has sufficient processing capacity and implementation margins to switch between capability sets. Upon making such determinations, non-legacy UE 115-c may transmit a capabilities report including the multiple capabilities at 305-a. Alternatively, if non-legacy UE 115-c determines that it does not have the capacity to semi-statically adjust between multiple capabilities sets, or if non-legacy UE 115-c determines that it does not have multiple capabilities sets, then non-legacy UE 115-c may elect to only transmit a single capability (e.g., a single maximum number of layers for a band combination).

At 305-b, legacy UE 115-d may transmit a capabilities report to base station 105-b. Legacy UE 115-d may not include any explicit indication of its ability to receive a maximum layer RRC parameter from base station 105-b. The lack of any indication of ability may be sufficient for base station 105-b to determine that legacy UE 115-d cannot receive a maximum layer RRC parameter (e.g., that legacy UE 115-d is a legacy device).

In some examples, legacy UE 115-d may transmit a non-ambiguous capabilities report. For instance, legacy UE 115-d may not have multiple capabilities, and may transmit its only capability for each band, subband, BWP, cell, or the like. Because there is no ambiguity as to which capability to utilize (e.g., because the legacy UE 115-d does not have multiple capabilities) the single capability for each band may be sufficient to indicate to the base station 105-b that legacy UE 115-d will not be able to successfully receive a maximum layer RRC parameter.

In some examples, legacy UE 115-d may have multiple capabilities, but may not have sufficient capacity to semi-statically adjust between multiple capabilities sets. In such cases, legacy UE 115-d may select the capacities set with the largest number of layers (e.g., four layers) and may report that capacities set in the UE capacities report at 305-b.

At 310, base station 105-*b* may determine whether to send a maximum layer RRC parameter to non-legacy UE 115-*c*, and whether to send a maximum layer RRC parameter to legacy UE 115-*d*.

For example, base station 105-*a* may receive a capabilities report from UE 115-*c* at 305-*a*. The capabilities report from non-legacy UE 115-*c* may include an indication that non-legacy UE 115-*c* is capable of successfully receiving the maximum layer RRC parameter. In such cases, base station 105-*b* may send an RRC message including the maximum layer RRC parameter to non-legacy UE 115-*c* at 315-*a*.

In some examples, base station 105-*c* may receive a capabilities report including multiple capabilities for non-legacy UE 115-*c* at 305-*a*. In such examples, base station 105-*b* may determine, based on the ambiguous capabilities, that non-legacy UE 115-*c* is capable of receiving a maximum layer RRC parameter. In such cases, base station 105-*b* may send an RRC message including the maximum layer RRC parameter to UE 115-*c* at 315-*a*. At 315-*a*, non-legacy UE 115-*c* may receive, from base station 105-*b* and in response to the transmitted capability information, the indication of the maximum number of layers (e.g., the maximum layer RRC parameter).

In some examples, base station 105-*b* may receive from legacy UE 115-*d* a capabilities report at 305-*b*. The capabilities report at 305-*b* may not include any explicit indication that legacy UE 115-*d* is capable of receiving a maximum layer RRC parameter. Based on the lack of an explicit indication, base station 105-*b* may assume that legacy UE 115-*d* is not capable of receiving the maximum layer RRC parameter, and refrain from sending the parameter in an RRC message at 315-*b*.

In some examples, base station 105-*b* may receive the capabilities report at 305-*b*, and the capabilities report may include only a single capability set per band. In such examples, base station 105-*b* may determine that, because there is no capabilities ambiguity, legacy UE 115-*d* is not capable of successfully receiving a maximum layer RRC parameter. In such examples, base station 105-*b* may refrain from sending the parameter in an RRC message at 315-*b*.

At 320-*b*, base station 105-*b* may perform continued wireless communications with UE 151-*c* and legacy UE 115-*d*. In some examples, at 320-*a*, base station 105-*b* may send downlink transmissions to non-legacy UE 115-*c* based on an updated maximum number of layers based on the maximum layer RRC parameter send to non-legacy UE 115-*c* at 315-*a*. For instance, non-legacy UE 115-*c* may continue to receive, according to the indicated maximum number of layers, signals from base station 105-*b* using the at least one set of frequency resources. In some examples, communication at 320 may include configuring a size of a soft buffer at non-legacy UE 115-*c*. Communication at 320-*a* may include selecting a CSI report format based at least in part on the indicated maximum number of layers at non-legacy UE 115-*c*, and transmitting a CSI report to base station 105-*b* according to the selected CSI report format. In some examples, non-legacy UE 115-*c* may determine, based on the indicated maximum number of layers, a sounding reference signal port sounding configuration, and may transmit sounding reference signals to base station 105-*b* according to the determined sounding reference signal port sounding configuration. In some examples, non-legacy UE 115-*c* may determine a DCI format based on the maximum number of layers, and may receive one or more DCI signals from base station 105-*b* based on the determined DCI format.

In some examples, base station 105-*b* may send downlink transmissions to legacy UE 115-*d* based on the same maximum number of layers initially configured for legacy UE 115-*d* (e.g., during a handover procedure or a RACH procedure, or the like).

Figure 4:
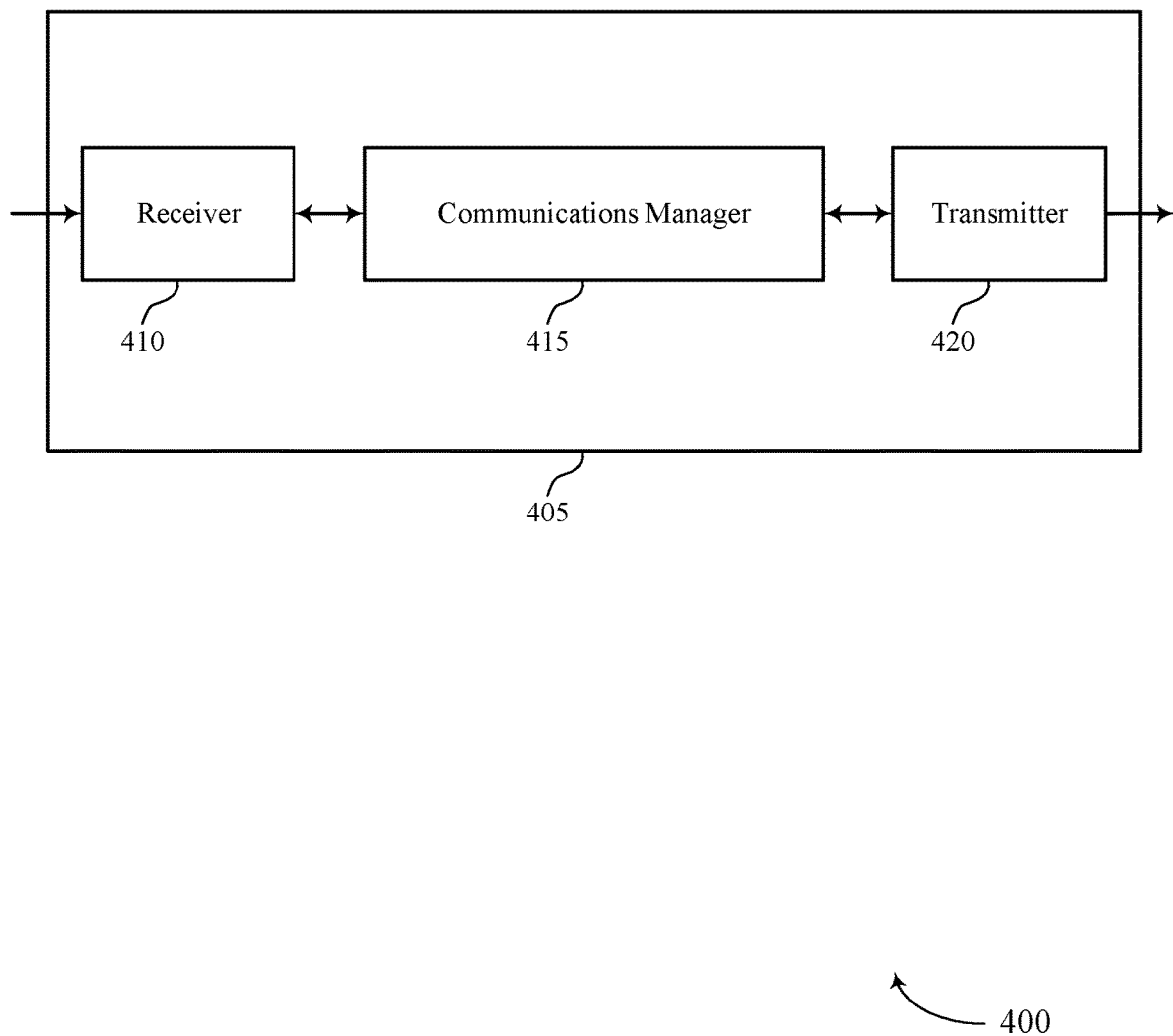
FIGS. 4 and 5 show block diagrams of devices that support configuring a maximum number of layers in accordance with aspects of the present disclosure.

FIG. 4 shows a block diagram 400 of a device 405 that supports configuring a maximum number of layers in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to configuring a maximum number of layers, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may transmit capability information indicating that the UE is capable of receiving, from a base station, an indication of a maximum number of layers that the base station will use to transmit to the UE in at least one set of frequency resources of a radio frequency (RF) spectrum band. The communications manager 415 may receive, from the base station in response to the transmitted capability information, the indication of the maximum number of layers. The communications manager 415 may receive, according to the indicated maximum number of layers, signals from the base station using the at least one set of frequency resources. The communications manager 415 may also identify two or more sets of values for a maximum number of layers a UE is capable of receiving from a base station for a first set of frequency resources of at least one set of frequency resources. The communications manager 415 may transmit, to the base station and in the capability information, two or more sets of values for the maximum number of layers a UE is capable of receiving for a first set of frequency resources of the at least one set of frequency resources. The communications manager 415 may receive, from the base station in response to the transmitted capability information, the indication of the maximum number of layers. The communications manager 415 may receive, according to the indicated maximum number of layers, signals from the base station using the at least one set of frequency resources. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

In some examples, the communications manager 415 may be implemented as an integrated circuit or chipset for a mobile device modem, and the receiver 410 and transmitter 420 may be implemented as analog components (e.g., amplifiers, filters, antennas) coupled with the mobile device modem to enable wireless transmission and reception over one or more bands.

The communications manager 415 as described herein may be implemented to realize one or more potential advantages. One implementation may allow the device to communicate using a lower number of layers during certain time periods, and only receive communicate with higher complexity as configured by the base station, resulting in increased processing efficiency.

Figure 7:
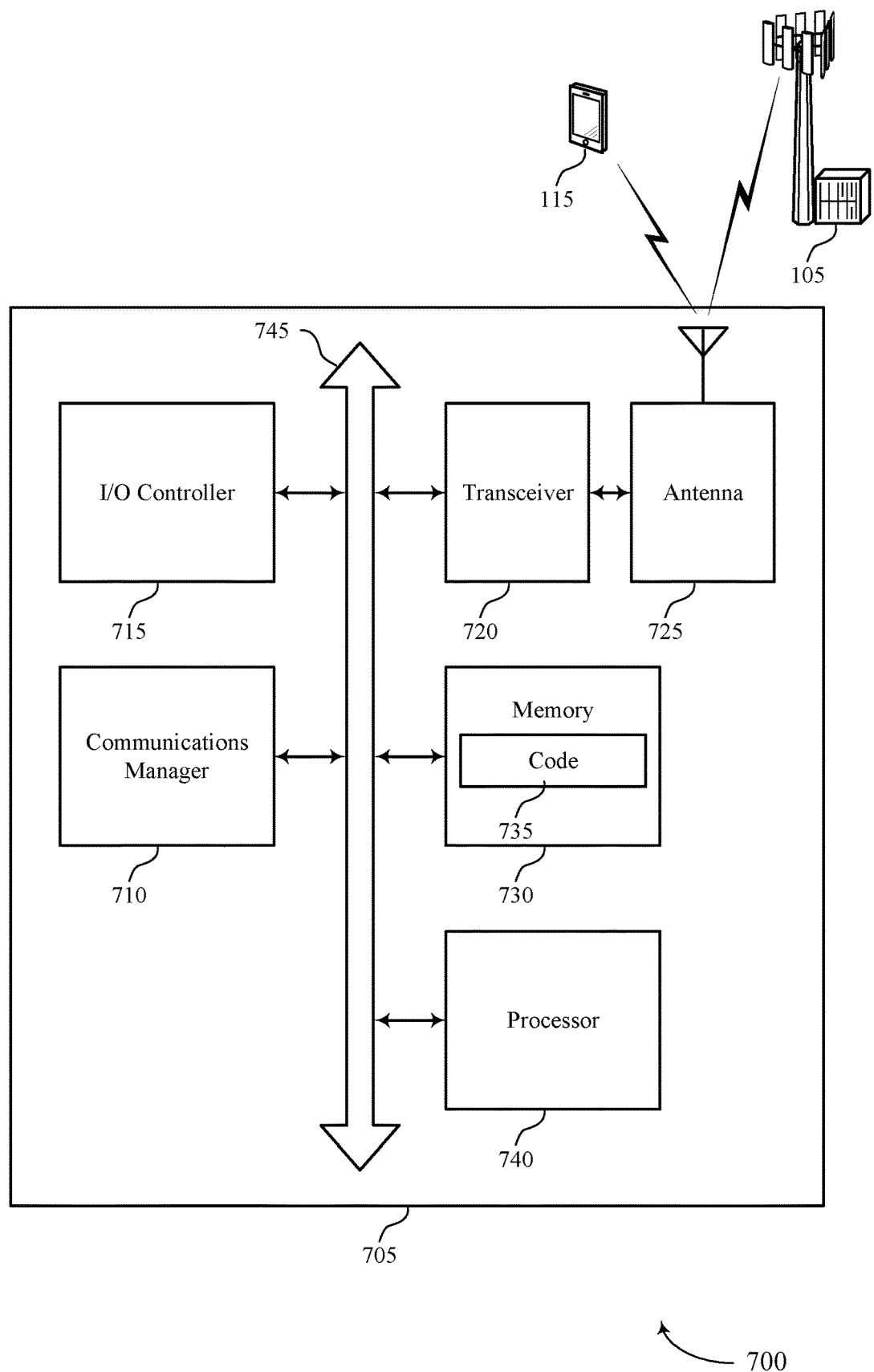
FIG. 7 shows a diagram of a system including a device that supports configuring a maximum number of layers in accordance with aspects of the present disclosure.

Based on techniques for efficiently communicating maximum number of layers for a device as described herein, a processor of a UE 115 (e.g., controlling the receiver 410, the transmitter 420, or a transceiver 720 as described with respect to FIG. 7) may increase system efficiency and decrease unnecessary processing at a device.

Figure 5:
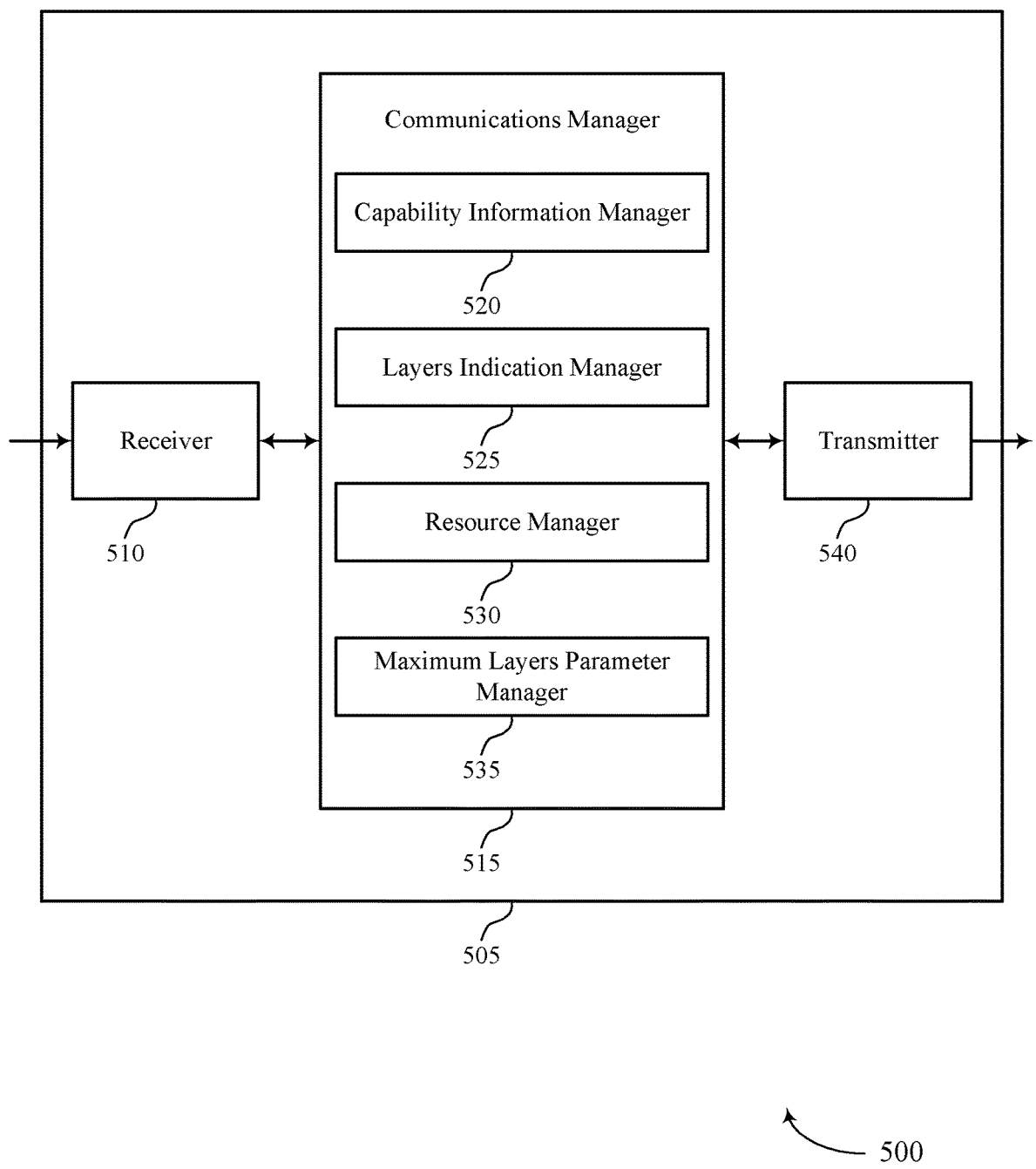

FIG. 5 shows a block diagram 500 of a device 505 that supports configuring a maximum number of layers in accordance with aspects of the present disclosure. The device 505 may be an example of aspects of a device 405, or a UE 115 as described herein. The device 505 may include a receiver 510, a communications manager 515, and a transmitter 540. The device 505 may also include a processor. Each of these components may be in communication with one another (e.g., via one or more buses).

The receiver 510 may receive information such as packets, user data, or control information associated with various information channels (e.g., control channels, data channels, and information related to configuring a maximum number of layers, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a capability information manager 520, a layers indication manager 525, a resource manager 530, and a maximum layers parameter manager 535. The communications manager 515 may be an example of aspects of the communications manager 710 described herein.

The capability information manager 520 may transmit capability information indicating that the UE is capable of receiving, from a base station, an indication of a maximum number of layers that the base station will use to transmit to the UE in at least one set of frequency resources of a radio frequency (RF) spectrum band.

The layers indication manager 525 may receive, from the base station in response to the transmitted capability information, the indication of the maximum number of layers.

The resource manager 530 may receive, according to the indicated maximum number of layers, signals from the base station using the at least one set of frequency resources.

The maximum layers parameter manager 535 may identify two or more sets of values for a maximum number of layers a UE is capable of receiving from a base station for a first set of frequency resources of at least one set of frequency resources and transmit, to the base station and in the capability information, two or more sets of values for the maximum number of layers a UE is capable of receiving for a first set of frequency resources of the at least one set of frequency resources.

The layers indication manager 525 may receive, from the base station in response to the transmitted capability information, the indication of the maximum number of layers.

The resource manager 530 may receive, according to the indicated maximum number of layers, signals from the base station using the at least one set of frequency resources.

The transmitter 540 may transmit signals generated by other components of the device 505. In some examples, the transmitter 540 may be collocated with a receiver 510 in a transceiver module. For example, the transmitter 540 may be an example of aspects of the transceiver 720 described with reference to FIG. 7. The transmitter 540 may utilize a single antenna or a set of antennas.

Figure 6:
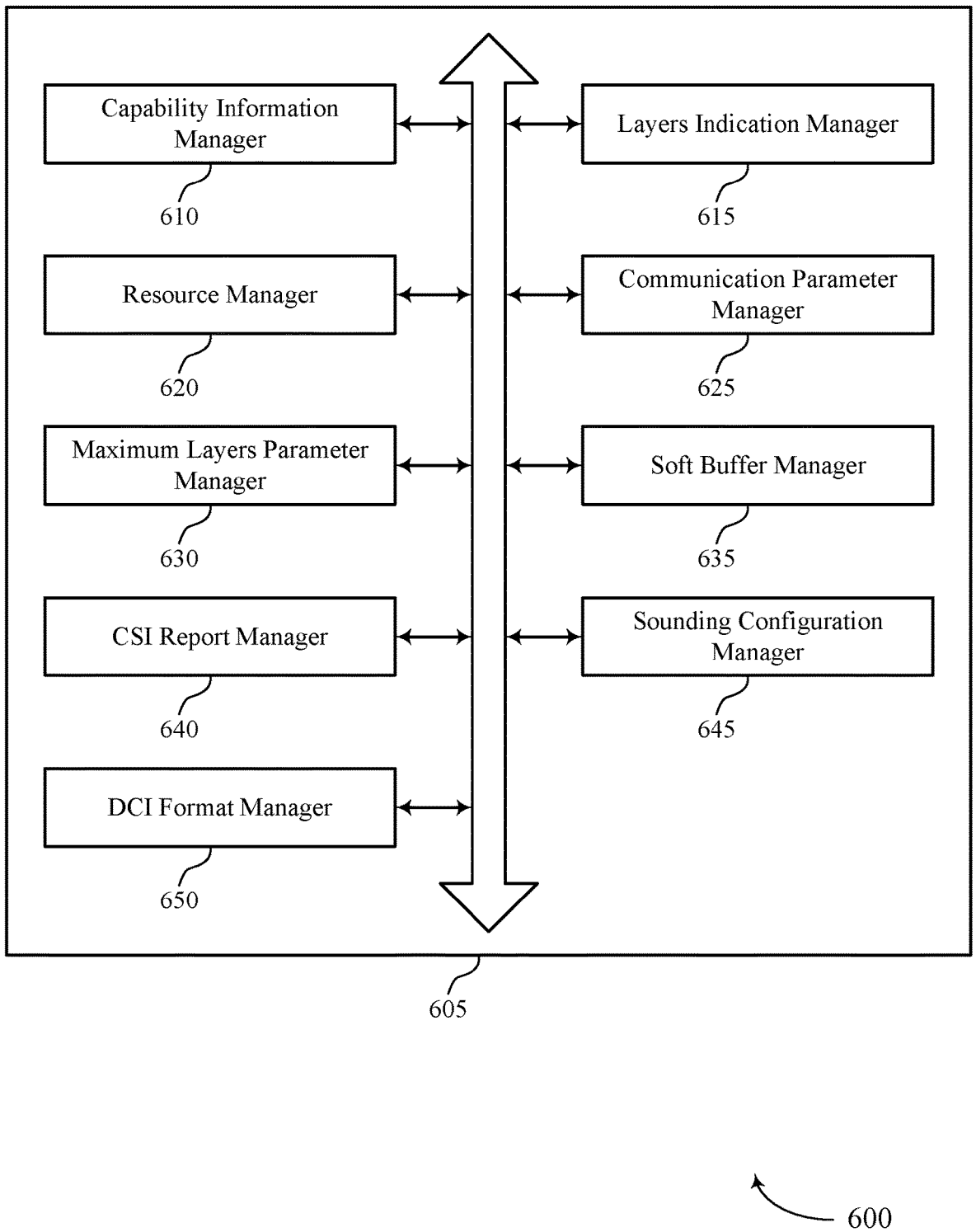
FIG. 6 shows a block diagram of a communications manager that supports configuring a maximum number of layers in accordance with aspects of the present disclosure.

FIG. 6 shows a block diagram 600 of a communications manager 605 that supports configuring a maximum number of layers in accordance with aspects of the present disclosure. The communications manager 605 may be an example of aspects of a communications manager 415, a communications manager 515, or a communications manager 710 described herein. The communications manager 605 may include a capability information manager 610, a layers indication manager 615, a resource manager 620, a communication parameter manager 625, a maximum layers parameter manager 630, a soft buffer manager 635, a CSI report manager 640, a sounding configuration manager 645, and a DCI format manager 650. Each of these modules may communicate, directly or indirectly, with one another (e.g., via one or more buses).

The capability information manager 610 may transmit capability information indicating that the UE is capable of receiving, from a base station, an indication of a maximum number of layers that the base station will use to transmit to the UE in at least one set of frequency resources of a radio frequency (RF) spectrum band. In some examples, the capability information manager 610 may transmit, in the capability information, a parameter value indicating that the UE is capable of receiving the indication of the maximum number of layers. In some examples, the capability information manager 610 may transmit, to the base station and in the capability information, the two or more sets of values of the at least one communication parameter and an identification of the first set of frequency resources.

The layers indication manager 615 may receive, from the base station in response to the transmitted capability information, the indication of the maximum number of layers. In some examples, the layers indication manager 615 may receive, from the base station in response to the transmitted capability information, the indication of the maximum number of layers.

The resource manager 620 may receive, according to the indicated maximum number of layers, signals from the base station using the at least one set of frequency resources. In some examples, the resource manager 620 may receive, according to the indicated maximum number of layers, signals from the base station using the at least one set of frequency resources. In some examples, the resource manager 620 may receive the signals from the base station using a number of layers equal to or less than the indicated maximum number of layers. In some examples, the resource manager 620 may transmit, to the base station, a UE radio access capability parameter indicating that the UE is capable of receiving the indication of the maximum number of layers. In some cases, the at least one set of frequency resources includes a bandwidth part, or a subband, or a combination thereof, of the RF spectrum band. In some cases, the at least one set of frequency resources includes a bandwidth part, or a subband, or a combination thereof, of the RF spectrum band.

The maximum layers parameter manager 630 may identify two or more sets of values for a maximum number of layers a UE is capable of receiving from a base station for a first set of frequency resources of at least one set of frequency resources. In some examples, the maximum layers parameter manager 630 may transmit, to the base station and in the capability information, two or more sets of values for the maximum number of layers a UE is capable of receiving for a first set of frequency resources of the at least one set of frequency resources. In some examples, the maximum layers parameter manager 630 may receive radio resource control signaling including a parameter that identifies the maximum number of layers.

In some examples, the maximum layers parameter manager 630 may transmit, to the base station, a UE radio access capability parameter indicating that the UE is capable of receiving the indication of the maximum number of layers. In some examples, the maximum layers parameter manager 630 may receive radio resource control signaling including a parameter that identifies the maximum number of layers. In some examples, the maximum layers parameter manager 630 may receive the signals from the base station using a number of layers equal to or less than the indicated maximum number of layers.

The communication parameter manager 625 may identify two or more sets of values of at least one communication parameter for a first set of frequency resources of the at least one set of frequency resources. In some cases, the at least one communication parameter includes a number of layers, or a modulation scheme, or a coding scheme, or a modulation and coding scheme, or a combination thereof. In some cases, the at least one communication parameter includes a number of layers, or a modulation scheme, or a coding scheme, or a modulation and coding scheme, or a combination thereof.

The soft buffer manager 635 may configure, based on the indicated maximum number of layers, a size of a soft buffer at the UE. In some examples, the soft buffer manager 635 may configure, based on the indicated maximum number of layers, a size of a soft buffer at the UE.

The CSI report manager 640 may select, by the UE, a CSI report format based on the indicated maximum number of layers. In some examples, the CSI report manager 640 may transmit a CSI report to the base station according to the selected CSI report format. In some examples, the CSI report manager 640 may select, by the UE, a CSI report format based on the indicated maximum number of layers.

In some examples, the CSI report manager 640 may transmit a CSI report to the base station according to the selected CSI report format.

The sounding configuration manager 645 may determine, based on the indicated maximum number of layers, a sounding reference signal port sounding configuration. In some examples, the sounding configuration manager 645 may transmit sounding reference signals to the base station according to the determined sounding reference signal port sounding configuration. In some examples, the sounding configuration manager 645 may determine, based on the indicated maximum number of layers, a sounding reference signal port sounding configuration. In some examples, the sounding configuration manager 645 may transmit sounding reference signals to the base station according to the determined sounding reference signal port sounding configuration.

The DCI format manager 650 may determine, by the UE, a downlink control information format based on the indicated maximum number of layers. In some examples, the DCI format manager 650 may receive, from the base station, at least on downlink control information signal according to the determined downlink control information format. In some examples, the DCI format manager 650 may determine, by the UE, a downlink control information format based on the indicated maximum number of layers. In some examples, the DCI format manager 650 may receive, from the base station, at least on downlink control information signal according to the determined downlink control information format.

FIG. 7 shows a diagram of a system 700 including a device 705 that supports configuring a maximum number of layers in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may transmit capability information indicating that the UE is capable of receiving, from a base station, an indication of a maximum number of layers that the base station will use to transmit to the UE in at least one set of frequency resources of a radio frequency (RF) spectrum band, receive, from the base station in response to the transmitted capability information, the indication of the maximum number of layers, and receive, according to the indicated maximum number of layers, signals from the base station using the at least one set of frequency resources. The communications manager 710 may also identify two or more sets of values for a maximum number of layers a UE is capable of receiving from a base station for a first set of frequency resources of at least one set of frequency resources, transmit, to the base station and in the capability information, two or more sets of values for the maximum number of layers a UE is capable of receiving for a first set of frequency resources of the at least one set of frequency resources, receive, from the base station in response to the transmitted capability information, the indication of the maximum number of layers, and receive, according to the indicated maximum number of layers, signals from the base station using the at least one set of frequency resources.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a BIOS which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting configuring a maximum number of layers).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
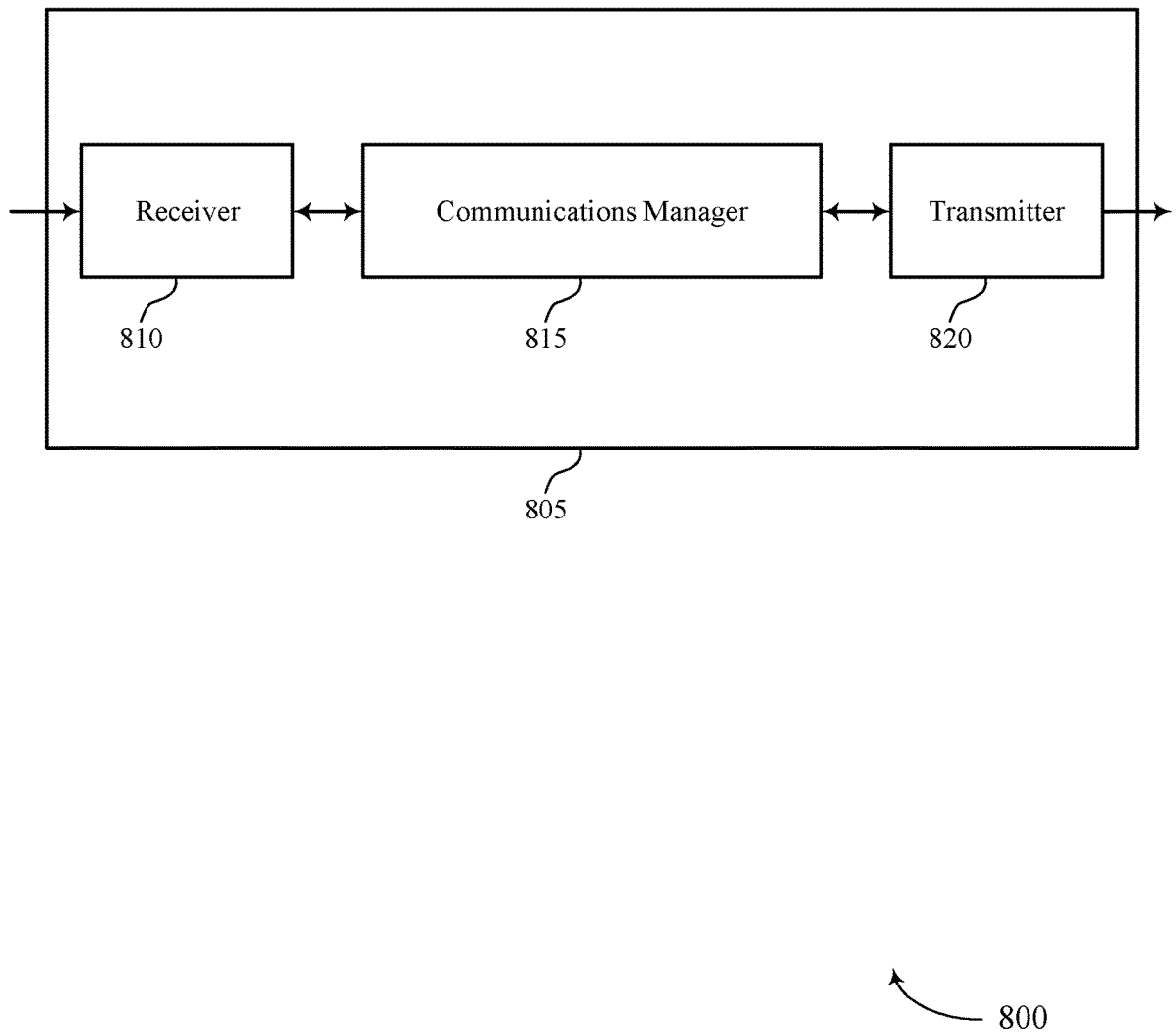
FIGS. 8 and 9 show block diagrams of devices that support configuring a maximum number of layers in accordance with aspects of the present disclosure.

FIG. 8 shows a block diagram 800 of a device 805 that supports configuring a maximum number of layers in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to configuring a maximum number of layers, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive, from a UE, capability information indicating that the UE is capable of receiving an indication of a maximum number of layers that the base station will use to transmit to the UE in at least one set of frequency resources of a radio frequency (RF) spectrum band. The communications manager 815 may transmit, to the UE in response to the received capability information, the indication of the maximum number of layers. The communications manager 815 may transmit, according to the indicated maximum number of layers, signals to the UE using the at least one set of frequency resources. The communications manager 815 may also receive, from a UE, capability including two or more sets of values of at least one communication parameter for a first set of frequency resources of at least one set of frequency resources. The communications manager 815 may determine, based on the received two or more sets of values of the at least one communication parameter, that the UE is capable of receiving the indication of the maximum number of layers, where the indication of the maximum number of layers is transmitted to the UE based on the determining. The communications manager 815 may transmit, to the UE in response to the received capability information, the indication of the maximum number of layers. The communications manager 815 may transmit, according to the indicated maximum number of layers, signals to the UE using the at least one set of frequency resources. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
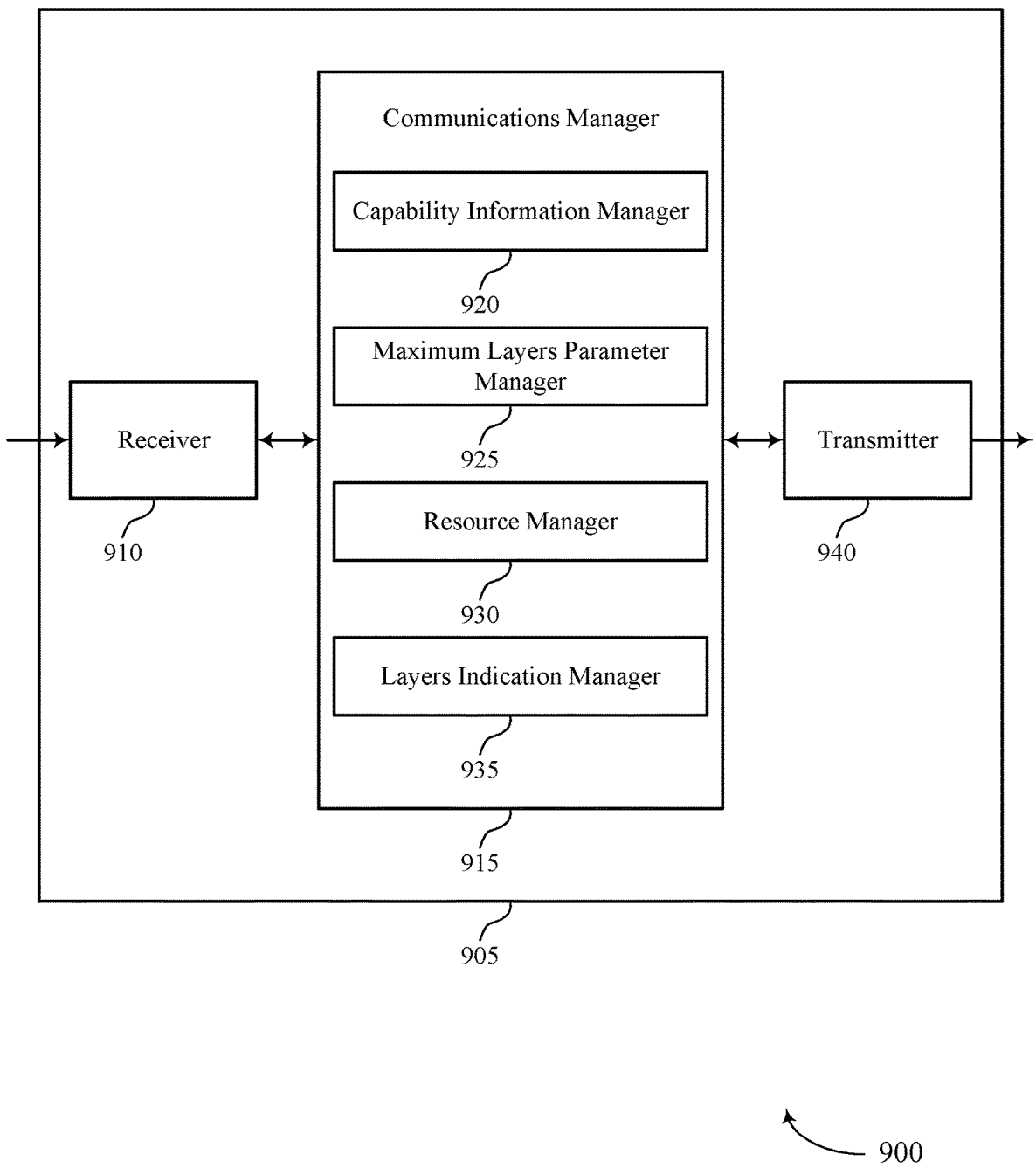

FIG. 9 shows a block diagram 900 of a device 905 that supports configuring a maximum number of layers in accordance with aspects of the present disclosure. The device 905 may be an example of aspects of a device 805, or a base station 105 as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to configuring a maximum number of layers, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a capability information manager 920, a maximum layers parameter manager 925, a resource manager 930, and a layers indication manager 935. The communications manager 915 may be an example of aspects of the communications manager 1110 described herein.

The capability information manager 920 may receive, from a UE, capability information indicating that the UE is capable of receiving an indication of a maximum number of layers that the base station will use to transmit to the UE in at least one set of frequency resources of a radio frequency (RF) spectrum band.

The maximum layers parameter manager 925 may transmit, to the UE in response to the received capability information, the indication of the maximum number of layers.

The resource manager 930 may transmit, according to the indicated maximum number of layers, signals to the UE using the at least one set of frequency resources.

The capability information manager 920 may receive, from a UE, capability including two or more sets of values of at least one communication parameter for a first set of frequency resources of at least one set of frequency resources.

The layers indication manager 935 may determine, based on the received two or more sets of values of the at least one communication parameter, that the UE is capable of receiving the indication of the maximum number of layers, where the indication of the maximum number of layers is transmitted to the UE based on the determining and transmit, to the UE in response to the received capability information, the indication of the maximum number of layers.

The resource manager 930 may transmit, according to the indicated maximum number of layers, signals to the UE using the at least one set of frequency resources.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
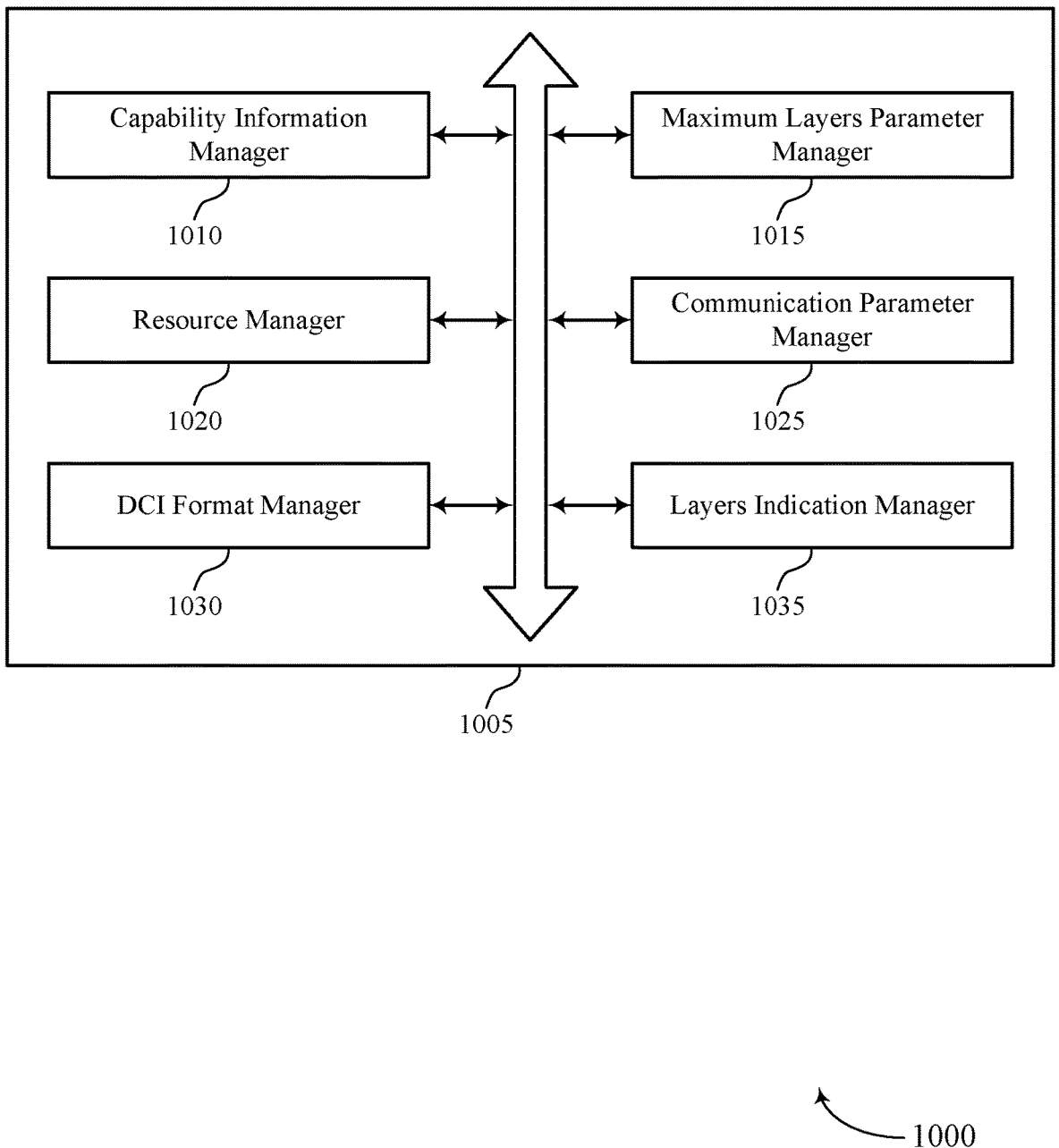
FIG. 10 shows a block diagram of a communications manager that supports configuring a maximum number of layers in accordance with aspects of the present disclosure.

FIG. 10 shows a block diagram 1000 of a communications manager 1005 that supports configuring a maximum number of layers in accordance with aspects of the present disclosure. The communications manager 1005 may be an example of aspects of a communications manager 815, a communications manager 915, or a communications manager 1110 described herein. The communications manager 1005 may include a capability information manager 1010, a maximum layers parameter manager 1015, a resource manager 1020, a communication parameter manager 1025, a DCI format manager 1030, and a layers indication manager 1035. Each of these modules may communicate, directly or indirectly, with one another (e.g., via one or more buses).

The capability information manager 1010 may receive, from a UE, capability information indicating that the UE is capable of receiving an indication of a maximum number of layers that the base station will use to transmit to the UE in at least one set of frequency resources of a radio frequency (RF) spectrum band.

In some examples, the capability information manager 1010 may receive, from a UE, a capability including two or more sets of values of at least one communication parameter for a first set of frequency resources of at least one set of frequency resources. In some examples, the capability information manager 1010 may receive, with the capability information, a parameter value indicating that the UE is capable of receiving the indication of the maximum number of layers. In some examples, the capability information manager 1010 may receive, in the capability information, two or more sets of values of at least one communication parameter for a first set of frequency resources of the at least one set of frequency resources.

The maximum layers parameter manager 1015 may transmit, to the UE in response to the received capability information, the indication of the maximum number of layers. In some examples, the maximum layers parameter manager 1015 may transmit radio resource control signaling including a parameter that identifies the maximum number of layers. In some cases, the at least one communication parameter includes a number of layers, or a modulation scheme, or a coding scheme, or a modulation and coding scheme, or a combination thereof.

The resource manager 1020 may transmit, according to the indicated maximum number of layers, signals to the UE using the at least one set of frequency resources. In some examples, the resource manager 1020 may transmit, according to the indicated maximum number of layers, signals to the UE using the at least one set of frequency resources. In some examples, the resource manager 1020 may transmit the signals to the UE using a number of layers equal to or less than the indicated maximum number of layers. In some examples, the resource manager 1020 may transmit radio resource control signaling including a parameter that identifies the maximum number of layers. In some examples, the resource manager 1020 may transmit the signals to the UE using a number of layers equal to or less than the indicated maximum number of layers. In some cases, the at least one set of frequency resources includes a bandwidth part, or a subband, or a combination thereof, of the RF spectrum band. In some cases, the at least one set of frequency resources includes a bandwidth part, or a subband, or a combination thereof, of the RF spectrum band.

The layers indication manager 1035 may determine, based on the received two or more sets of values of the at least one communication parameter, that the UE is capable of receiving the indication of the maximum number of layers, where the indication of the maximum number of layers is transmitted to the UE based on the determining. In some examples, the layers indication manager 1035 may transmit, to the UE in response to the received capability information, the indication of the maximum number of layers. In some examples, the layers indication manager 1035 may determine, based on the received two or more sets of values of the at least one communication parameter, that the UE is capable of receiving the indication of the maximum number of layers, where the indication of the maximum number of layers is transmitted to the UE based on the determining.

The communication parameter manager 1025 may receive, in the capability information, two or more sets of values of at least one communication parameter for a first set of frequency resources of the at least one set of frequency resources. In some examples, the communication parameter manager 1025 may determine, based on the received two or more sets of values of the at least one communication parameter, that the UE is capable of receiving the indication of the maximum number of layers, where the indication of the maximum number of layers is transmitted to the UE based on the determining.

In some examples, the communication parameter manager 1025 may receive, from the base station, a UE radio access capability parameter indicating that the UE is capable of receiving the indication of the maximum number of layers. In some examples, the communication parameter manager 1025 may receive, from the base station, a UE radio access capability parameter indicating that the UE is capable of receiving the indication of the maximum number of layers. In some cases, the at least one communication parameter includes a number of layers, or a modulation scheme, or a coding scheme, or a modulation and coding scheme, or a combination thereof.

The DCI format manager 1030 may determine a downlink control information format for the UE based on the maximum number of layers. In some examples, the DCI format manager 1030 may transmit, to the UE, at least on downlink control information signal according to the determined downlink control information format. In some examples, the DCI format manager 1030 may determine a downlink control information format for the UE based on the maximum number of layers. In some examples, the DCI format manager 1030 may transmit, to the UE, at least on downlink control information signal according to the determined downlink control information format.

Figure 11:
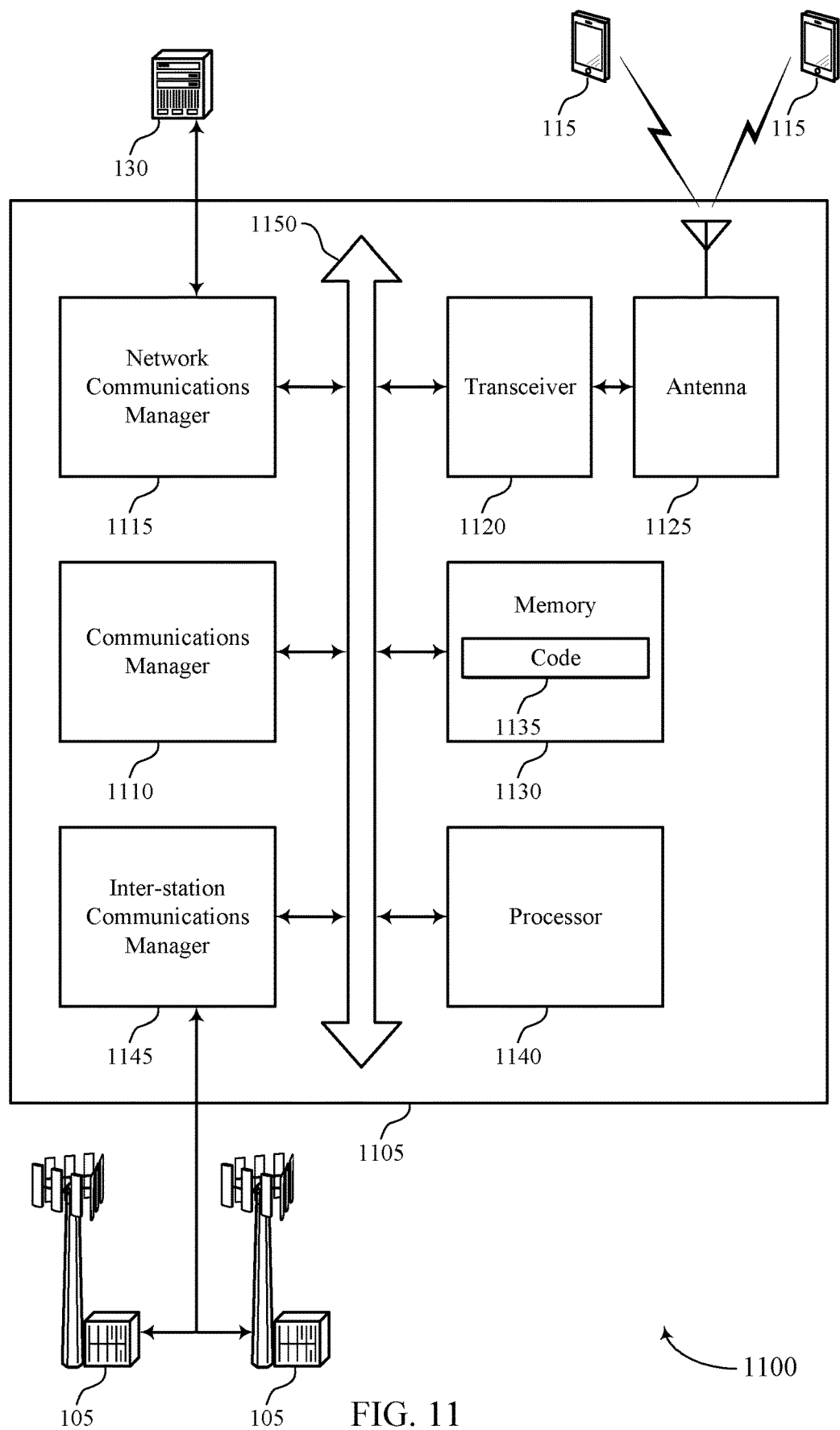
FIG. 11 shows a diagram of a system including a device that supports configuring a maximum number of layers in accordance with aspects of the present disclosure.

FIG. 11 shows a diagram of a system 1100 including a device 1105 that supports configuring a maximum number of layers in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may receive, from a UE, capability information indicating that the UE is capable of receiving an indication of a maximum number of layers that the base station will use to transmit to the UE in at least one set of frequency resources of a radio frequency (RF) spectrum band. The communications manager 1110 may transmit, to the UE in response to the received capability information, the indication of the maximum number of layers. The communications manager 1110 may transmit, according to the indicated maximum number of layers, signals to the UE using the at least one set of frequency resources. The communications manager 1110 may also receive, from a UE, capability including two or more sets of values of at least one communication parameter for a first set of frequency resources of at least one set of frequency resources. The communications manager 1110 may determine, based on the received two or more sets of values of the at least one communication parameter, that the UE is capable of receiving the indication of the maximum number of layers, where the indication of the maximum number of layers is transmitted to the UE based on the determining. The communications manager 1110 may transmit, to the UE in response to the received capability information, the indication of the maximum number of layers. The communications manager 1110 may transmit, according to the indicated maximum number of layers, signals to the UE using the at least one set of frequency resources.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting configuring a maximum number of layers).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
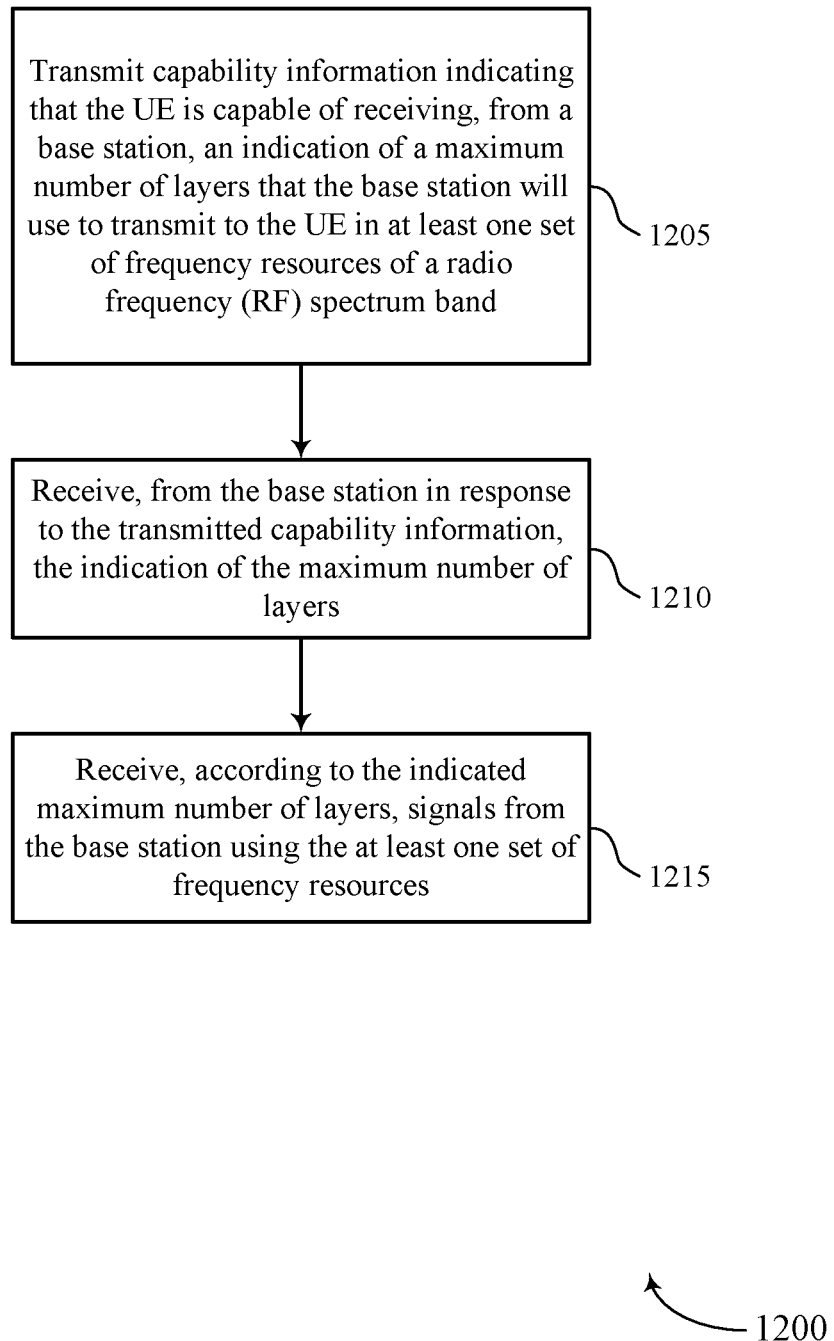
FIGS. 12 through 16 show flowcharts illustrating methods that support configuring a maximum number of layers in accordance with aspects of the present disclosure.

FIG. 12 shows a flowchart illustrating a method 1200 that supports configuring a maximum number of layers in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally, or alternatively, a UE may perform aspects of the functions described below using special-purpose hardware.

At 1205, the UE may transmit capability information indicating that the UE is capable of receiving, from a base station, an indication of a maximum number of layers that the base station will use to transmit to the UE in at least one set of frequency resources of a radio frequency (RF) spectrum band. The operations of 1205 may be performed according to the methods described herein. In some examples, aspects of the operations of 1205 may be performed by a capability information manager as described with reference to FIGS. 4 through 7.

At 1210, the UE may receive, from the base station in response to the transmitted capability information, the indication of the maximum number of layers. The operations of 1210 may be performed according to the methods described herein. In some examples, aspects of the operations of 1210 may be performed by a layers indication manager as described with reference to FIGS. 4 through 7.

At 1215, the UE may receive, according to the indicated maximum number of layers, signals from the base station using the at least one set of frequency resources. The operations of 1215 may be performed according to the methods described herein. In some examples, aspects of the operations of 1215 may be performed by a resource manager as described with reference to FIGS. 4 through 7.

Figure 13:
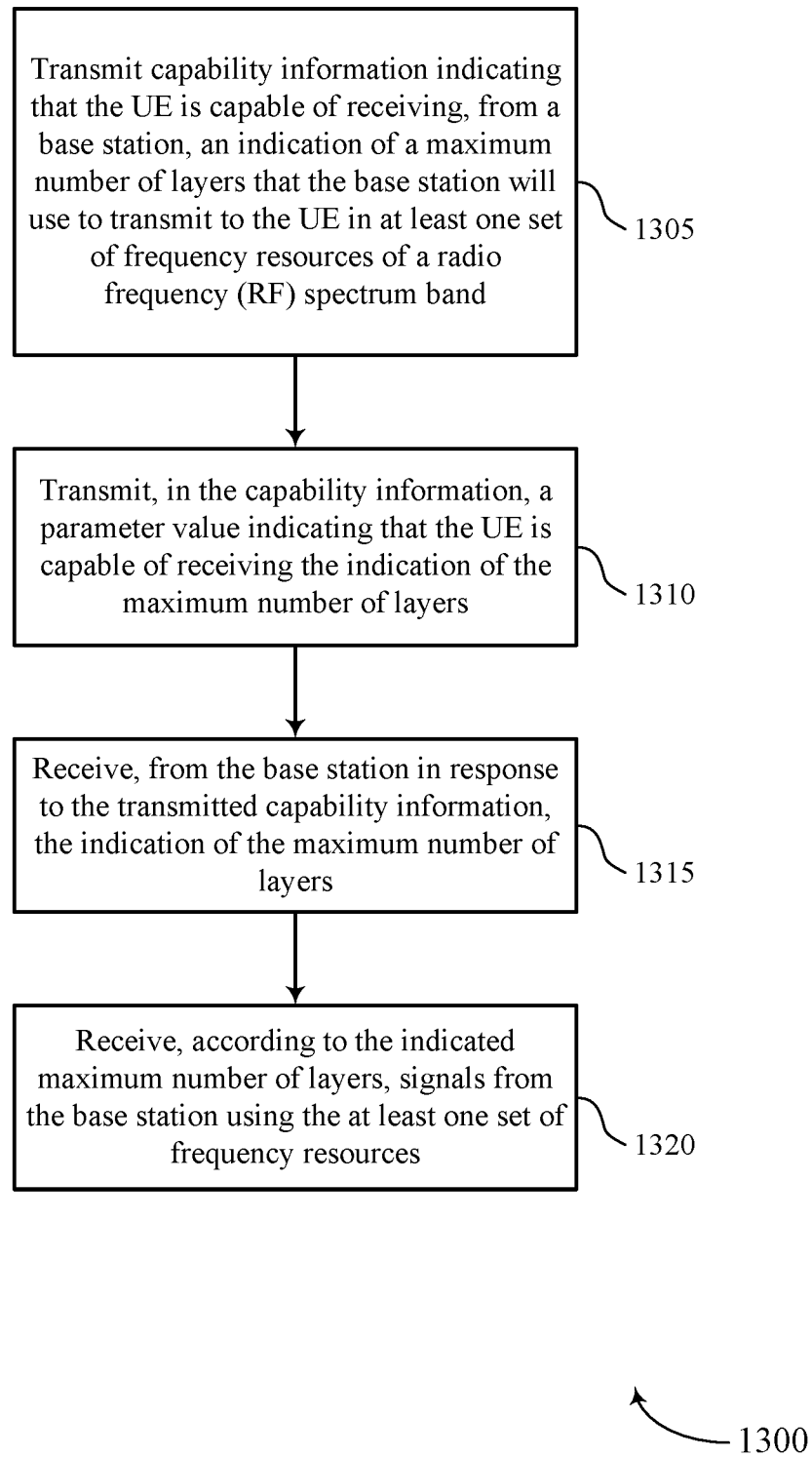

FIG. 13 shows a flowchart illustrating a method 1300 that supports configuring a maximum number of layers in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally, or alternatively, a UE may perform aspects of the functions described below using special-purpose hardware.

At 1305, the UE may transmit capability information indicating that the UE is capable of receiving, from a base station, an indication of a maximum number of layers that the base station will use to transmit to the UE in at least one set of frequency resources of a radio frequency (RF) spectrum band. The operations of 1305 may be performed according to the methods described herein. In some examples, aspects of the operations of 1305 may be performed by a capability information manager as described with reference to FIGS. 4 through 7.

At 1310, the UE may transmit, in the capability information, a parameter value indicating that the UE is capable of receiving the indication of the maximum number of layers. The operations of 1310 may be performed according to the methods described herein. In some examples, aspects of the operations of 1310 may be performed by a capability information manager as described with reference to FIGS. 4 through 7.

At 1315, the UE may receive, from the base station in response to the transmitted capability information, the indication of the maximum number of layers. The operations of 1315 may be performed according to the methods described herein. In some examples, aspects of the operations of 1315 may be performed by a layers indication manager as described with reference to FIGS. 4 through 7.

At 1320, the UE may receive, according to the indicated maximum number of layers, signals from the base station using the at least one set of frequency resources. The operations of 1320 may be performed according to the methods described herein. In some examples, aspects of the operations of 1320 may be performed by a resource manager as described with reference to FIGS. 4 through 7.

Figure 14:
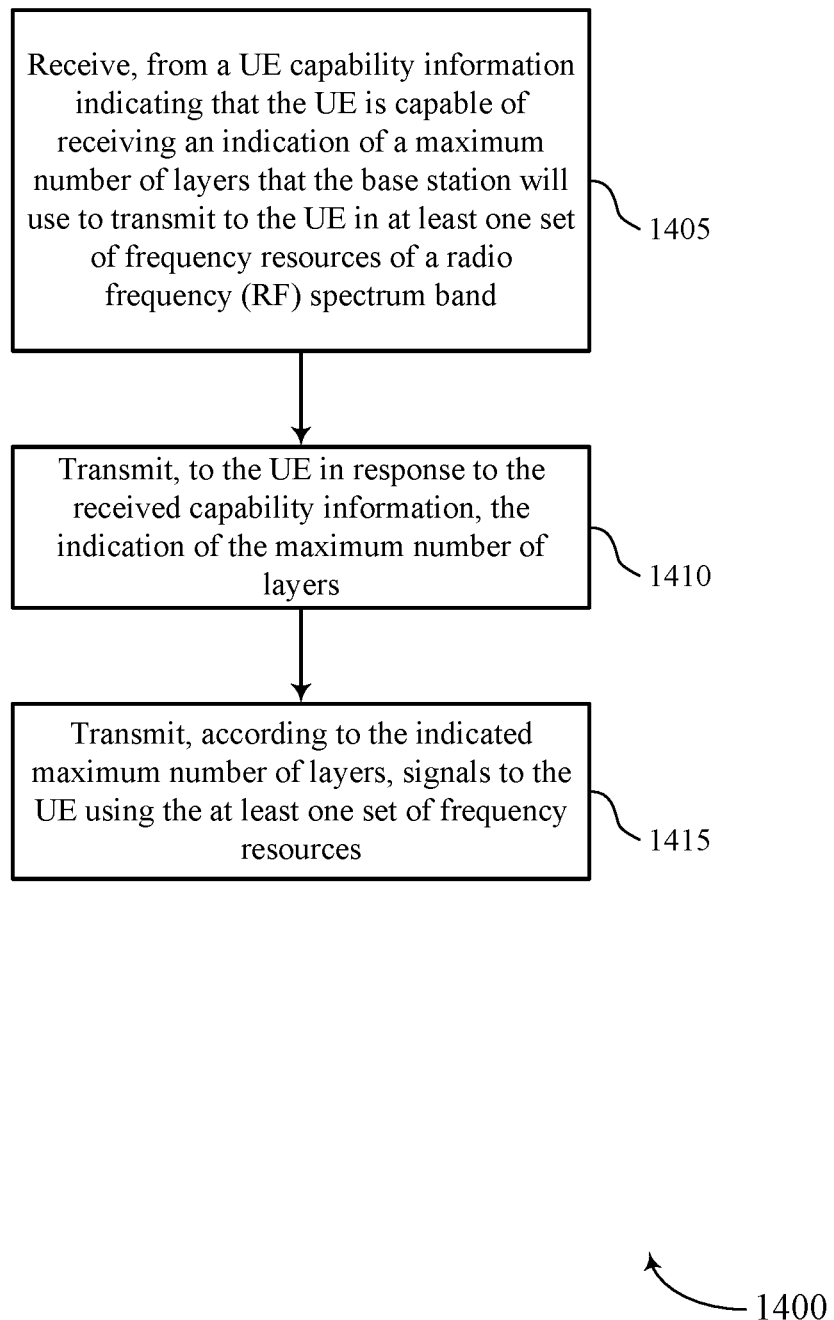

FIG. 14 shows a flowchart illustrating a method 1400 that supports configuring a maximum number of layers in accordance with aspects of the present disclosure. The operations of method 1400 may be implemented by a base station 105 or its components as described herein. For example, the operations of method 1400 may be performed by a communications manager as described with reference to FIGS. 8 through 11. In some examples, a base station may execute a set of instructions to control the functional elements of the base station to perform the functions described below. Additionally, or alternatively, a base station may perform aspects of the functions described below using special-purpose hardware.

At 1405, the base station may receive, from a UE, capability information indicating that the UE is capable of receiving an indication of a maximum number of layers that the base station will use to transmit to the UE in at least one set of frequency resources of a radio frequency (RF) spectrum band. The operations of 1405 may be performed according to the methods described herein. In some examples, aspects of the operations of 1405 may be performed by a capability information manager as described with reference to FIGS. 8 through 11.

At 1410, the base station may transmit, to the UE in response to the received capability information, the indication of the maximum number of layers. The operations of 1410 may be performed according to the methods described herein. In some examples, aspects of the operations of 1410 may be performed by a maximum layers parameter manager as described with reference to FIGS. 8 through 11.

At 1415, the base station may transmit, according to the indicated maximum number of layers, signals to the UE using the at least one set of frequency resources. The operations of 1415 may be performed according to the methods described herein. In some examples, aspects of the operations of 1415 may be performed by a resource manager as described with reference to FIGS. 8 through 11.

Figure 15:
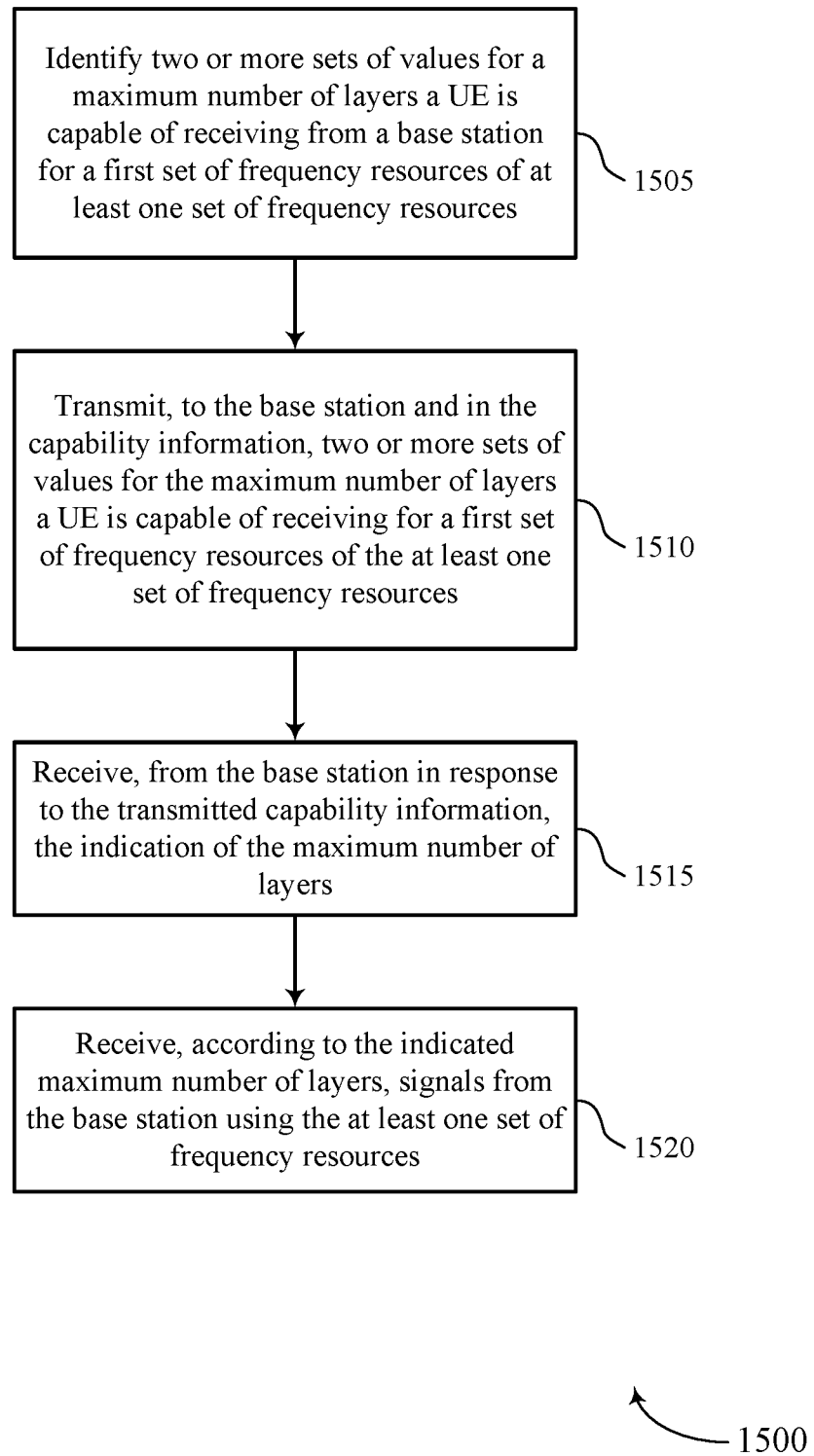

FIG. 15 shows a flowchart illustrating a method 1500 that supports configuring a maximum number of layers in accordance with aspects of the present disclosure. The operations of method 1500 may be implemented by a UE 115 or its components as described herein. For example, the operations of method 1500 may be performed by a communications manager as described with reference to FIGS. 4 through 7. In some examples, a UE may execute a set of instructions to control the functional elements of the UE to perform the functions described below. Additionally, or alternatively, a UE may perform aspects of the functions described below using special-purpose hardware.

At 1505, the UE may identify two or more sets of values for a maximum number of layers a UE is capable of receiving from a base station for a first set of frequency resources of at least one set of frequency resources. The operations of 1505 may be performed according to the methods described herein. In some examples, aspects of the operations of 1505 may be performed by a maximum layers parameter manager as described with reference to FIGS. 4 through 7.

At 1510, the UE may transmit, to the base station and in the capability information, two or more sets of values for the maximum number of layers a UE is capable of receiving for a first set of frequency resources of the at least one set of frequency resources. The operations of 1510 may be performed according to the methods described herein. In some examples, aspects of the operations of 1510 may be performed by a maximum layers parameter manager as described with reference to FIGS. 4 through 7.

At 1515, the UE may receive, from the base station in response to the transmitted capability information, the indication of the maximum number of layers. The operations of 1515 may be performed according to the methods described herein. In some examples, aspects of the operations of 1515 may be performed by a layers indication manager as described with reference to FIGS. 4 through 7.

At 1520, the UE may receive, according to the indicated maximum number of layers, signals from the base station using the at least one set of frequency resources. The operations of 1520 may be performed according to the methods described herein. In some examples, aspects of the operations of 1520 may be performed by a resource manager as described with reference to FIGS. 4 through 7.

Figure 16:
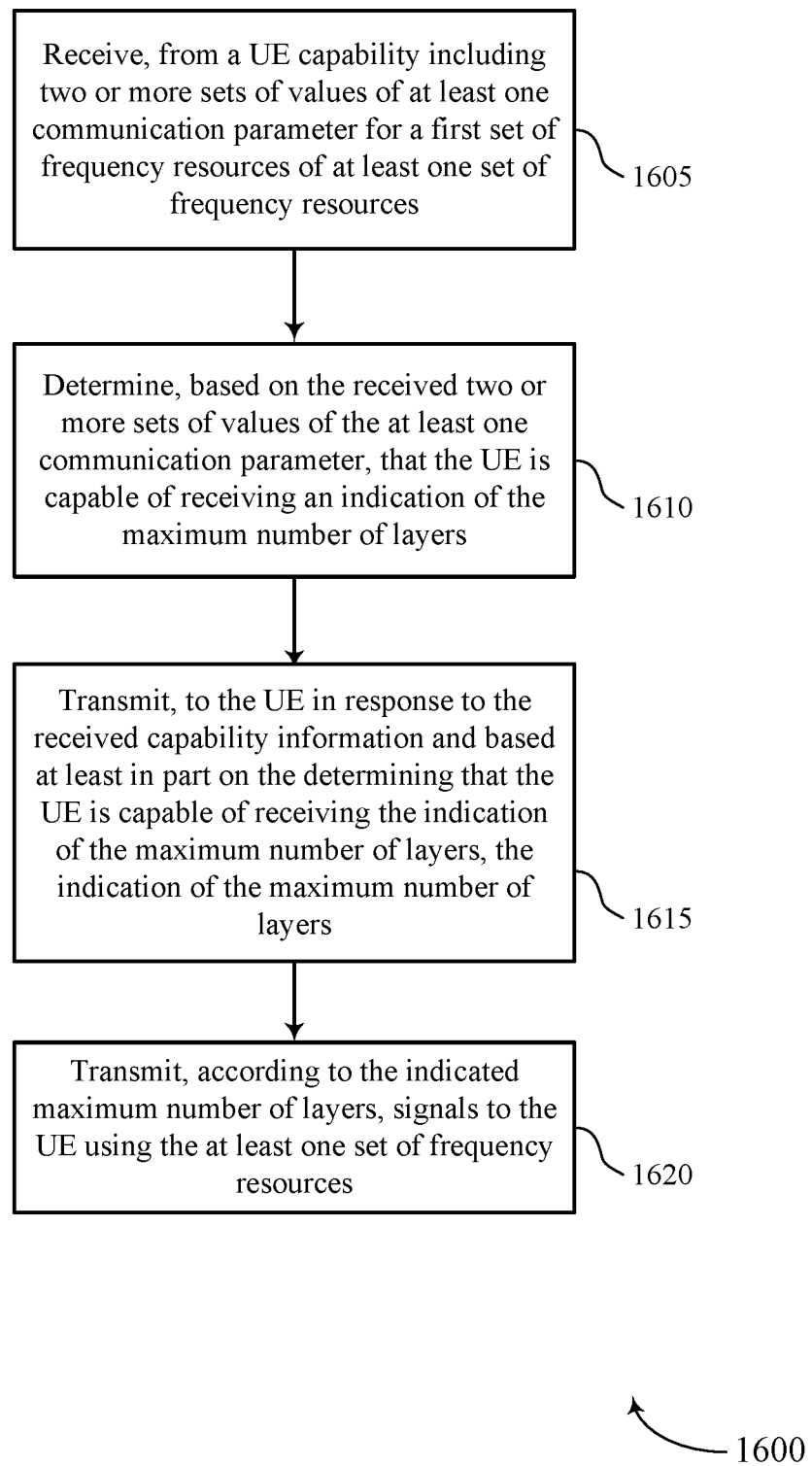

FIG. 16 shows a flowchart illustrating a method 1600 that supports configuring a maximum number of layers in accordance with aspects of the present disclosure. The operations of method 1600 may be implemented by a base station 105 or its components as described herein. For example, the operations of method 1600 may be performed by a communications manager as described with reference to FIGS. 8 through 11. In some examples, a base station may execute a set of instructions to control the functional elements of the base station to perform the functions described below. Additionally, or alternatively, a base station may perform aspects of the functions described below using special-purpose hardware.

At 1605, the base station may receive, from a UE, a capability including two or more sets of values of at least one communication parameter for a first set of frequency resources of at least one set of frequency resources. The operations of 1605 may be performed according to the methods described herein. In some examples, aspects of the operations of 1605 may be performed by a capability information manager as described with reference to FIGS. 8 through 11.

At 1610, the base station may determine, based on the received two or more sets of values of the at least one communication parameter, that the UE is capable of receiving the indication of the maximum number of layers. The operations of 1610 may be performed according to the methods described herein. In some examples, aspects of the operations of 1610 may be performed by a layers indication manager as described with reference to FIGS. 8 through 11.

At 1615, the base station may transmit, to the UE in response to the received capability information and based at least in part on the determining that the UE is capable of receiving the indication of the maximum number of layers, the indication of the maximum number of layers. The operations of 1615 may be performed according to the methods described herein. In some examples, aspects of the operations of 1615 may be performed by a layers indication manager as described with reference to FIGS. 8 through 11.

At 1620, the base station may transmit, according to the indicated maximum number of layers, signals to the UE using the at least one set of frequency resources. The operations of 1620 may be performed according to the methods described herein. In some examples, aspects of the operations of 1620 may be performed by a resource manager as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    transmitting capability information comprising a parameter value, wherein the parameter value is a single bit that indicates a capability of the UE to read, and subsequently use, a radio resource control parameter from an access network entity, the radio resource control parameter identifying a first maximum number of layers that the access network entity will use to transmit to the UE, on a downlink, in at least one bandwidth part of a radio frequency (RF) spectrum band, wherein the first maximum number of layers comprises a maximum number of data streams for downlink transmissions, wherein the capability information comprises the parameter value if the UE has the capability to read, and subsequently use, the radio resource control parameter or lacks the parameter value if the UE lacks the capability to read, and subsequently use, the radio resource control parameter;
    receiving, from the access network entity in response to the transmitted capability information comprising the parameter value that indicates the capability of the UE to read, and subsequently use, the radio resource control parameter, the radio resource control parameter identifying the first maximum number of layers that the access network entity will use to transmit to the UE;
    configuring, based at least in part on receiving the radio resource control parameter from the access network entity that identifies the first maximum number of layers, a size of a soft buffer at the UE; and
    receiving, according to the identified first maximum number of layers, signals from the access network entity using the at least one bandwidth part.

2. The method of claim 1, further comprising:
    selecting, by the UE, a channel state information (CSI) report format based at least in part on the identified first maximum number of layers in the at least one bandwidth part; and
    transmitting a CSI report to the access network entity according to the selected CSI report format.

3. The method of claim 1, further comprising:
    determining, by the UE, a downlink control information format based at least in part on the identified first maximum number of layers in the at least one bandwidth part; and
    receiving, from the access network entity, at least one downlink control information signal according to the determined downlink control information format.

4. The method of claim 1, wherein transmitting the capability information comprises:
    transmitting, to the access network entity, a UE radio access capability parameter indicating a capability of the UE to read, and subsequently use, the radio resource control parameter that identifies the first maximum number of layers in the at least one bandwidth part.

5. The method of claim 1, wherein receiving the signals from the access network entity according to the identified first maximum number of layers in the at least one bandwidth part comprises:
    receiving the signals from the access network entity using a number of layers equal to or less than the identified first maximum number of layers in the at least one bandwidth part.

6. A method for wireless communication at an access network entity, comprising:
    receiving, from a user equipment (UE), capability information comprising a parameter value, wherein the parameter value indicates a capability of the UE to read, and subsequently use, a radio resource control parameter from the access network entity, the radio resource control parameter identifying a first maximum number of layers that the access network entity will use to transmit to the UE, on a downlink, in at least one bandwidth part of a radio frequency (RF) spectrum band, wherein the first maximum number of layers indicates a maximum number of data streams for downlink transmissions;
    transmitting, to the UE in response to the received capability information comprising the parameter value that indicates the capability of the UE to read, and subsequently use, the radio resource control parameter, the radio resource control parameter identifying the first maximum number of layers that the access network entity will use to transmit to the UE; and
    transmitting, according to the identified first maximum number of layers, signals to the UE using the at least one bandwidth part, wherein the first maximum number of layers is associated with a soft buffer size at the UE.

7. The method of claim 6, further comprising:
    determining a downlink control information format for the UE based at least in part on the identified first maximum number of layers in the at least one bandwidth part; and
    transmitting, to the UE, at least one downlink control information signal according to the determined downlink control information format.

8. The method of claim 6, wherein receiving the capability information comprises:
    receiving, from the UE, a UE radio access capability parameter indicating a capability of the UE to read, and subsequently use, the radio resource control parameter that identifies the first maximum number of layers in the at least one bandwidth part.

9. The method of claim 6, wherein transmitting the signals to the UE according to the identified first maximum number of layers in the at least one bandwidth part comprises:
    transmitting the signals to the UE using a number of layers equal to or less than the identified first maximum number of layers in the at least one bandwidth part.

10. An apparatus for wireless communication at a user equipment (UE), comprising:
    one or more processors, one or more memories in electronic communication with the one or more processors; and
    instructions stored in the one or more memories and executable by the one or more processors to cause the apparatus to:
        transmit capability information comprising a parameter value, wherein the parameter value indicates a capability of the UE to read, and subsequently use, a radio resource control parameter from an access network entity, the radio resource control parameter identifying a first maximum number of layers that the access network entity will use to transmit to the UE, on a downlink, in at least one bandwidth part of a radio frequency (RF) spectrum band, wherein the first maximum number of layers indicates a maximum number of data streams for downlink transmissions;

receive, from the access network entity in response to the transmitted capability information comprising the parameter value that indicates the capability of the UE to read, and subsequently use, the radio resource control parameter, the radio resource control parameter identifying the first maximum number of layers that the access network entity will use to transmit to the UE;

configure, based at least in part on receiving the radio resource control parameter from the access network entity that identifies the first maximum number of layers, a size of a soft buffer at the UE; and receive, according to the identified first maximum number of layers, signals from the access network entity using the at least one bandwidth part.

11. The apparatus of claim 10, wherein the instructions are further executable by the one or more processors to cause the apparatus to:

select, by the UE, a channel state information (CSI) report format based at least in part on the identified first maximum number of layers in the at least one bandwidth part; and transmit a CSI report to the access network entity according to the selected CSI report format.

12. The apparatus of claim 10, wherein the instructions are further executable by the one or more processors to cause the apparatus to:

determine, by the UE, a downlink control information format based at least in part on the identified first maximum number of layers in the at least one bandwidth part; and receive, from the access network entity, at least one downlink control information signal according to the determined downlink control information format.

13. The apparatus of claim 10, wherein the instructions to transmit the capability information are executable by the one or more processors to cause the apparatus to:

transmit, to the access network entity, a UE radio access capability parameter indicating a capability of the UE to read, and subsequently use, the radio resource control parameter that identifies the first maximum number of layers in the at least one bandwidth part.

14. An apparatus for wireless communication at an access network entity, comprising:

one or more processors, one or more memories in electronic communication with the one or more processors; and instructions stored in the one or more memories and executable by the one or more processors to cause the apparatus to:

receive, from a user equipment (UE), capability information comprising a parameter value, wherein the parameter value indicates a capability of the UE to read, and subsequently use, a radio resource control parameter from the access network entity, the radio resource control parameter identifying a first maximum number of layers that the access network entity will use to transmit to the UE, on a downlink, in at least one bandwidth part of a radio frequency (RF) spectrum band, wherein the first maximum number of layers indicates a maximum number of data streams for downlink transmissions;

transmit, to the UE in response to the received capability information comprising the parameter value that indicates the UE to read, and subsequently use, the radio resource control parameter, the radio resource control parameter identifying the first maximum number of layers that the access network entity will use to transmit to the UE; and transmit, according to the identified first maximum number of layers, signals to the UE using the at least one bandwidth part, wherein the first maximum number of layers is associated with a soft buffer size at the UE.

15. The apparatus of claim 14, wherein the instructions are further executable by the one or more processors to cause the apparatus to:

determine a downlink control information format for the UE based at least in part on the identified first maximum number of layers in the at least one bandwidth part; and transmit, to the UE, at least one downlink control information signal according to the determined downlink control information format.

16. The apparatus of claim 14, wherein the instructions to receive the capability information are executable by the one or more processors to cause the apparatus to:

receive, from the UE, a UE radio access capability parameter indicating a capability of the UE to read, and subsequently use, the radio resource control parameter that identifies the first maximum number of layers in the at least one bandwidth part.

* * * * *